(12) United States Patent
Togura et al.

(10) Patent No.: US 8,573,700 B2
(45) Date of Patent: Nov. 5, 2013

(54) HEADREST POSITION ADJUSTMENT DEVICE AND HEADREST POSITION ADJUSTMENT METHOD

(75) Inventors: Takeshi Togura, Sakura (JP); Yuichiro Yamaguchi, Sakura (JP)

(73) Assignee: Fujikura Ltd., Tokyo (JP)

( * ) Notice: Subject to any disclaimer, the term of this patent is extended or adjusted under 35 U.S.C. 154(b) by 526 days.

(21) Appl. No.: 12/675,639

(22) PCT Filed: Aug. 27, 2008

(86) PCT No.: PCT/JP2008/065262
§ 371 (c)(1),
(2), (4) Date: May 20, 2010

(87) PCT Pub. No.: WO2009/028532
PCT Pub. Date: Mar. 5, 2009

(65) Prior Publication Data
US 2010/0225153 A1    Sep. 9, 2010

(30) Foreign Application Priority Data

Aug. 27, 2007  (JP) ................................. 2007-220030
Aug. 27, 2007  (JP) ................................. 2007-220035

(51) Int. Cl.
*A47C 7/36*    (2006.01)
(52) U.S. Cl.
USPC ....... 297/391; 297/410; 297/408; 297/216.12
(58) Field of Classification Search
USPC .................................................. 297/216.12
See application file for complete search history.

(56) References Cited

U.S. PATENT DOCUMENTS 6,042,145 A * 3/2000 Mitschelen et al. .......... 280/735
(Continued)

FOREIGN PATENT DOCUMENTS

| JP | 64-11511 A | 1/1989 |
| JP | 64-11512 A | 1/1989 |

(Continued)

OTHER PUBLICATIONS

International Search Report of PCT/JP2008/065262, mailing date of Nov. 11, 2008.

*Primary Examiner* — Sarah B McPartlin
(74) *Attorney, Agent, or Firm* — Westerman, Hattori, Daniels & Adrian, LLP

(57) ABSTRACT

To perform highly precise position adjustment for head restraint in short time regardless of distance between head restraint and human body and head shape. Head restraint position adjusting device 100 includes capacitance sensor unit 10 and drive motor unit 30. Capacitance sensor unit 10 includes first and third sensing electrodes 11 and 13 and detection circuit 20. First sensing electrode 11 is arranged in an upper portion of front portion of head restraint 43 and senses capacitance between itself and vicinity of parietal region 49a of head 49 of human body 48. Third sensing electrode 13 is arranged in lower portion of front portion and senses capacitance between itself and any portion of human body 48 other than vicinity of parietal region 49a. When head restraint 43 moves from initial condition, detection circuit 20 detects position of parietal region 49a of head 49 (parietal region position) and determines appropriate position of head restraint 43 for head 49, enabling highly precise position adjustment in short time.

16 Claims, 13 Drawing Sheets

(56) References Cited

U.S. PATENT DOCUMENTS

| | | |
|---|---|---|
| 6,402,195 B1 | 6/2002 | Eisenmann et al. |
| 2005/0264051 A1* | 12/2005 | Lawall et al. ............ 297/216.12 |
| 2007/0267909 A1* | 11/2007 | Truckenbrodt et al. ....... 297/410 |
| 2008/0042472 A1* | 2/2008 | Holdampf et al. .............. 297/15 |
| 2008/0111407 A1 | 5/2008 | Szablewski |
| 2008/0129100 A1 | 6/2008 | Szablewski |
| 2009/0121526 A1* | 5/2009 | Akaike et al. ............ 297/216.12 |

FOREIGN PATENT DOCUMENTS

| | | |
|---|---|---|
| JP | 2000-309242 A | 11/2000 |
| JP | 2006-024646 A | 1/2006 |
| JP | 2006-153754 A | 6/2006 |
| JP | 2008-162430 A | 7/2008 |
| JP | 2008-532599 A | 8/2008 |
| JP | 2008-532833 A | 8/2008 |
| WO | 2006/094760 A1 | 9/2006 |

* cited by examiner

HEADREST POSITION ADJUSTMENT DEVICE AND HEADREST POSITION ADJUSTMENT METHOD

TECHNICAL FIELD

The present invention relates to a head restraint position adjusting device and a head restraint position adjusting method which adjust a position of a head restraint attached to a seat of a vehicle like an automobile, and more particularly, a head restraint position adjusting device and a head restraint position adjusting method which automatically adjust a position of the head restraint to an appropriate position.

Conventionally, there are devices which adjust a position of a head restraint attached to a seat of a vehicle like an automobile. Patent literature 1 discloses a device for adjusting a head restraint. Such a device comprises a sensor including two capacitor plates which are for detecting a position of a head of a driver/passenger, and which are arranged inside the head restraint. The two capacitor plates are arranged in the up and down direction inside the head restraint.

The head of a driver/passenger is made to function as a derivative by capacitors, part of which is constituted by these capacitor plates. As far as a sensor signal from one capacitor plate increases while at the same a sensor signal from another capacitor plate decreases, a position of the head restraint in height is adjusted in such a manner as to be changed from a home position where the head restraint is retracted (i.e., a position closest to a backrest).

Patent literature 2 discloses a head restraint driving device that comprises support means for movably supporting a head restraint, drive means for reciprocatingly driving the head restraint, plural sensing electrodes which are spaced apart from one another inside a portion of an external cover of the head restraint supporting a head, capacitance detection means for detecting capacitances formed by the plural sensing electrodes relative to a common potential line, and position control means for controlling the drive means to move the head restraint in a direction in which the capacitances are balanced.

This head restraint driving device drives the head restraint in such a way that the capacitances are balanced and the head is located at a center of the plural sensing electrodes, in other words, in such a way that the head restraint is located in accordance with a motion of the head, whereby a position of the head restraint is automatically adjusted to an appropriate position for the head (to the center of the head).

Patent Literature 2: JP2000-309242A
Patent Literature 3: JPS64-11512A

DISCLOSURE OF INVENTION

Problem to be Solved by the Invention

According to the device for adjusting the head restraint disclosed in patent literature 1, however, a capacitance between the head and the sensing electrode is measured by each of the two or three capacitor plates and the measurement result is used for adjusting the position. This raises a problem that when the distance between the capacitor plates arranged inside the head restraint and the head is large, detection of the capacitance between the capacitor plates and the whole head in order to move the head restraint in the up and down direction does not result in detection of a significant change in the capacitance, making it difficult to adjust the head restraint to an appropriate position.

Further, the fundamental requisite of this device is that the shape of the head (occipital region) seen from the head restraint should be a spherical shape that makes the center position of the head come closest to the head restraint. Therefore, it is impossible to specify the center position of the head when, for example, the shape of the head (occipital region) is a flat shape or a passenger is seated in such a posture, likewise making it difficult to adjust the head restraint to an appropriate position.

According to the head restraint driving device disclosed in patent literature 2, the head restraint is moved in a way that the capacitances from the plural sensing electrodes are balanced. Therefore, when, for example, the occipital shape of the head is not round but is relatively flat or when the head and each sensing electrode are away (when a passenger is seated in a way to make the head away from the head restraint), the range in which the capacitances from the respective sensing electrodes are balanced might be broadened or the balanced state might not be achieved at the center position of the head, raising a problem that the head restraint can not necessarily be adjusted to an appropriate position.

The present invention was made in view of these problems, and an object of the present invention is to provide a head restraint position adjusting device and a head restraint position adjusting method which can securely adjust a head restraint to an appropriate position (an appropriate position for the head, etc.) in a short time irrespective of the distance between the head of a human body and a head restraint and the shape of the head.

Means for Solving the Problem

A head restraint position adjusting device according to the present invention includes: at least one upper sensing electrode provided in an upper portion of a front portion of a head restraint provided on a seat of a vehicle, and configured to sense a capacitance between a human body sitting on the seat and the head restraint; at least one lower sensing electrode provided in a lower portion of the front portion of the head restraint, and configured to sense a capacitance between the human body and the head restraint; a detection circuit configured to detect a parietal region position of a head of the human body based on sensing signals from the upper sensing electrode and the lower sensing electrode; and position adjusting means configured to, in accordance with a detection result from the detection circuit, adjust a position of the head restraint relative to the seat to an appropriate position for the head, the appropriate position being based on the parietal region position, the detection circuit being configured to detect the parietal region position by comparing a capacitance value indicated by a capacitance, based on the sensing signal from the upper sensing electrode, between a vicinity of a parietal region of the head and the head restraint, with a capacitance value indicated by a capacitance, based on the sensing signal from the lower sensing electrode, between a portion of the human body other than the vicinity of the parietal region and the head restraint, and the position adjusting means being configured to, when a comparison value based on the capacitance value from the upper sensing electrode and the capacitance value from the lower sensing electrode is not included in a preset threshold range, move the head restraint in an upward direction or a downward direction until the comparison value comes within the threshold range, and the detection circuit being configured to determine the parietal region position when the comparison value is within the threshold range.

By having the above configuration, the head restraint position adjusting device according to the present invention can automatically and securely adjust the position of the head restraint relative to the seat to an appropriate position for the head. Therefore, regardless of the distance between the head of a human body and the head restraint and the shape of the head, it is possible to adjust the head restraint securely to an appropriate position (for example, an appropriate position for the head) in a short time.

Since the position of the head restraint can be automatically adjusted to an appropriate position for the head, it is possible to suppress any accident like cervical spine injury of a driver/passenger when a vehicle collides under a condition in which a position of the head restraint is not adjusted. Furthermore, since the parietal region position of the head can be securely detected based on capacitance values from the upper sensing electrode and the lower sensing electrode and the position of the head restraint can be adjusted based on this parietal region position, it is possible to perform highly precise position adjustment without being influenced by the position of the shoulder and neck of a human body, the sitting height, or various such factors.

The upper sensing electrode comprises, for example, first and second sensing electrodes provided at positions in the upper portion of the front portion of the head restraint, which positions are near both ends of the head restraint in a horizontal direction along a front face of the head restraint, and the lower sensing electrode comprises a third sensing electrode provided at a position in the lower portion of the front portion of the head restraint, which position is near a middle between the both ends of the head restraint in the horizontal direction along the front face.

The detection circuit may include: a plurality of capacitance sensing circuits connected to the upper sensing electrode and the lower sensing electrode respectively and configured to output information indicating capacitances sensed by the sensing electrodes respectively; and an arithmetic processing circuit configured to calculate the parietal region position by using capacitance values based on the information from the plurality of capacitance sensing circuits and output a signal corresponding to calculation result information to the position adjusting means.

The detection circuits may include: a plurality of capacitance sensing circuits connected to the first, second, and third sensing electrodes in one-to-one correspondence and configured to output information indicating capacitances sensed by the sensing electrodes respectively; and an arithmetic processing circuit configured to calculate the parietal region position by using capacitance values based on the information from the plurality of capacitance sensing circuits and output a signal corresponding to calculate result information to the position adjusting means.

For example, the position adjusting means may move the head restraint to an uppermost position or a lowermost position relative to the seat, before starting moving the head restraint to the appropriate position.

At least two upper sensing electrodes may be provided. The detection circuit may detect a center position of the head in a horizontal direction, in addition to the parietal region position, based on the sensing signals. In accordance with a detection result from the detection circuit, the position adjusting means may adjust the position of the head restraint relative to the seat to an appropriate position for the head that is based on the parietal region position and the center position in the horizontal direction.

With this configuration, it is possible to automatically and securely adjust the position of the head restraint relative to the seat to an appropriate position for the head based on the parietal region position the head of a human body and the center position of the head in the horizontal direction.

For example, the upper sensing electrodes are provided at least at positions in the upper portion of the front portion of the head restraint respectively, which positions are near both ends of the head restraint in a horizontal direction along the front face, and the lower sensing electrode is provided at least at a position in the lower portion of the front portion of the head restraint, which position is near a middle between the both ends of the head restraint in the horizontal direction along the front face.

The detection circuit may detect the parietal region position by comparing capacitance values indicated by capacitances, based on sensing signals from the upper sensing electrodes, between vicinities of the parietal region of the head and the head restraint, with a capacitance value indicated by a capacitance, based on a sensing signal from the lower sensing electrode, between a portion of the human body other than the vicinities of the parietal region and the head restraint, and detect the center position in the horizontal direction by comparing the capacitance values from the upper sensing electrodes respectively with each other.

In this case, when a comparison value based on capacitance values from the upper sensing electrodes and a capacitance value from the lower sensing electrode is not included in a preset threshold range, the position adjusting means may move the head restraint in an upward direction or a downward direction until the comparison value comes within the threshold range, and after the detection circuit determines the parietal region position when the comparison value is included in the threshold range, the position adjusting means may move the head restraint in a leftward direction or a rightward direction until the capacitance values from the upper sensing electrodes become equal detected values, and the detection circuit may determine the center position in the horizontal direction when the detected values become equal.

The upper sensing electrodes comprises first and second sensing electrodes provided at positions in the upper portion of the front portion of the head restraint respectively, which positions are near the both ends of the head restraint in the horizontal direction, and the lower sensing electrode comprises a third sensing electrode provided at a position in the lower portion of the front portion of the head restraint, which position is near the middle between the both ends in the horizontal direction.

The detection circuit may include: a plurality of capacitance sensing circuits connected to the first, second, and third sensing electrodes in one-to-one correspondence and configured to output information indicating capacitances sensed by the sensing electrodes respectively; and an arithmetic processing circuit configured to calculate the parietal region position and the center position in the horizontal direction by using capacitance values based on the information from the plurality of capacitance sensing circuits and output a signal corresponding to calculation result information to the position adjusting means.

The detection circuit may include: a first capacitance sensing circuit directly connected to either one of the first and second sensing electrodes while being connected to the other of them via a first switch and configured to output information indicating capacitances sensed by these sensing electrodes; a second capacitance sensing circuit connected via a second switch to the sensing electrode connected via the first switch to the first capacitance sensing circuit while being connected to the third sensing electrode via a third switch and configured to output information indicating capacitances sensed by these sensing electrodes; and an arithmetic processing circuit configured to calculate the parietal region position and the center position in the horizontal direction by using capacitance values based on the information from the first and second capacitance sensing circuits and output a signal corresponding to calculation result information to the position adjusting means.

The position adjusting means may move the head restraint to a center position of the seat at an uppermost position or a lowermost position relative to the seat, before starting moving the head restraint to the appropriate position.

Each of the capacitance sensing circuits may include: a C-V conversion circuit configured to convert a capacitance sensed by the sensing electrode to a voltage; and an A/D conversion circuit configured to convert an analog signal from the C-V conversion circuit to a digital signal.

There may be provided a plurality of auxiliary electrodes arranged in an internal side of the head restraint opposite to the front portion where the upper sensing electrode and the lower sensing electrode are provided, and configured to suppress change of capacitances of the sensing electrodes due to an external condition change, and the plurality of auxiliary electrodes may be given a potential equal to that of the sensing electrodes.

The auxiliary electrode may further be provided at least at a position of the head restraint that is near the seat and near the lower sensing electrode.

A head restraint position adjusting method according to the present invention includes: sensing a capacitance between a human body sitting on a seat of a vehicle and a head restraint provided on the seat, by means of at least one upper sensing electrode provided in an upper portion of a front portion of the head restraint and at least one lower sensing electrode provided in a lower portion of the front portion of the head restraint; detecting a parietal region position of a head of the human body, based on sensing signals from the upper sensing electrode and the lower sensing electrode indicating sensed capacitances; adjusting a position of the head restraint relative to the seat to an appropriate position for the head based on the detected parietal region position; in detecting the parietal region position, comparing a capacitance value indicated by a capacitance, based on the sensing signal from the upper sensing electrode, between a vicinity of a parietal region of the head and the head restraint, with a capacitance value indicated by a capacitance, based on the sensing signal from the lower sensing electrode, between a portion of the human body other than the vicinity of the parietal region and the head restraint, thereby detecting the parietal region position; and in adjusting the position of the head restraint to the appropriate position, when a comparison value based on the capacitance value from the upper sensing electrode and the capacitance value from the lower sensing electrode is not included in a preset threshold range, moving the head restraint in an upward direction or a downward direction until the comparison value comes within the threshold range, and stopping the head restraint at the appropriate position by determining the parietal region position when the comparison value is included in the threshold range.

With the above configuration, the head restraint position adjusting method according to the present invention can automatically and securely adjust the position of the head restraint relative to the seat to an appropriate position for the head based on the parietal region position of the head of the human body. Therefore, it is possible to adjust the head restraint to an appropriate position (for example, an appropriate position for the head) securely in a short time regardless of the distance between the head of the human body and the head restraint and the shape of the head.

Further, since the position of the head restraint can be automatically adjusted to an appropriate position for the head, it is possible to suppress any accident like cervical spine injury of a driver/passenger when a vehicle collides under a condition in which a position of the head restraint is not adjusted. Furthermore, since the parietal region position of the head can be securely detected based on capacitance values from the upper sensing electrode and the lower sensing electrode and the position of the head restraint can be adjusted based on this parietal region position, it is possible to perform highly precise position adjustment without being influenced by the position of the shoulder and neck of a human body, the sitting height, or various such factors.

The upper sensing electrode comprises first and second sensing electrodes provided at positions in the upper portion of the front portion of the head restraint, which positions are near both ends of the head restraint in a horizontal direction along a front face of the head restraint, and the lower sensing electrode comprises a third sensing electrode provided at a position in the lower portion of the front portion of the head restraint, which position is near a middle between the both ends of the head restraint in the horizontal direction along the front face.

Before the position of the head restraint is adjusted to the appropriate position, the head restraint is moved to an uppermost position or a lowermost position relative to the seat.

At least two upper sensing electrodes may be provided. In addition to the parietal region position, a center position of the head in a horizontal direction may be detected based on the sensing signals. The position of the head restraint relative to the seat may be adjusted to an appropriate position for the head based on the parietal region position and the center position in the horizontal direction that are detected.

With this configuration, it is possible to automatically and securely adjust the position of the head restraint relative to the seat to an appropriate position for the head based on the parietal region position of the head of the human body and the center position of the head in the horizontal direction. Therefore, it is possible to securely adjust the head restraint to an appropriate position for the head in a short time regardless of the distance between the head of the human body and the head restraint and the shape of the head.

In detecting the parietal region position and the center position in the horizontal direction, capacitance values indicated by capacitances, based on sensing signals from the upper sensing electrodes, between vicinities of the parietal region of the head and the head restraint may be compared with a capacitance value indicated by a capacitance, based on a sensing signal from the lower sensing electrode, between a portion of the human body other than the vicinities of the parietal region and the head restraint to thereby detect the parietal region position, and the capacitance values from the upper sensing electrodes may be compared with each other to thereby detect the center position in the horizontal direction.

In adjusting the position of the head restraint to the appropriate position, when a comparison value based on capacitance values from the upper sensing electrodes and a capacitance value from the lower sensing electrode is not included in a preset threshold range, the head restraint may be moved in an upward direction or a downward direction until the comparison value comes within the threshold range, after the parietal region position is determined when the comparison value is included in the threshold range, the head restraint may be moved in a leftward direction or a rightward direction until the capacitance values from the upper sensing electrodes become equal detected values, and when the detected values become equal, the center position in the horizontal direction may be determined to stop the head restraint at the appropriate position.

In this case, the upper sensing electrodes are constituted by first and second sensing electrodes provided at positions in the upper portion of the front portion of the head restraint respectively, the positions being near both ends of the head restraint in the horizontal direction, and the lower sensing electrode is constituted by a third sensing electrode provided at a position in the lower portion of the front portion of the head restraint, the position being near a middle between the both ends in the horizontal direction.

Before the position of the head restraint is adjusted to the appropriate position, the head restraint may be moved to a center position of the seat at an uppermost position or a lowermost position relative to the seat.

Effect of the Invention

According to the present invention, it is possible to provide a head restraint position adjusting device and a head restraint position adjusting method that can automatically and securely adjust the position of a head restraint relative to a seat to an appropriate position for the head of a human body based on a parietal region position of the head, and can securely adjust the head restraint to the appropriate position regardless of the distance between the head of the human body and the head restraint and the shape of the head.

Further, according to the present invention, it is possible to provide a head restraint position adjusting device and a head restraint adjusting method that can automatically and securely adjust the position of a head restraint relative to a seat to an appropriate position for the head of a human body based on a parietal region position of the head and the center position of the head in the horizontal direction, and can securely adjust the head restraint to the appropriate position for the head in a short time regardless of the distance between the head of the human body and the head restraint and the shape of the head.

BEST MODE FOR CARRYING OUT THE INVENTION

An explanation will be given of a preferred embodiment for a head restraint position adjusting device and a head restraint position adjusting method of the present invention with reference to the accompanying drawings.

FIG. 1 is a schematic diagram showing an example of a seat in a vehicle provided with a head restraint position adjusting device according to a first embodiment of the present invention. FIG. 2 is an explanatory diagram showing an example arrangement of a part of the head restraint position adjusting device in a head restraint. FIG. 3 is a block diagram showing an example of a whole configuration of the head restraint position adjusting device.

FIG. 4 is a block diagram showing an example configuration of a C-V conversion circuit in a capacitance detection circuit in a detection circuit of the head restraint position adjusting device. FIG. 5 is an operation waveform chart showing an example of an operation waveform of the detection circuit of the head restraint position adjusting device. FIG. 6 are operation explanation diagrams for explaining operations of the head restraint position adjusting device.

As shown in FIGS. 1 and 2, a head restraint position adjusting device 100 according to the first embodiment is provided in a seat 40 of a vehicle and the like, and comprises, for example, a capacitance sensor unit 10 arranged in a head restraint 43 of the seat 40, and a drive motor unit 30 arranged in a backrest 41 of the seat 40. According to the head restraint position adjusting device 100 of the first embodiment, the capacitance sensor unit 10 and the drive motor unit 30 are electrically connected together by, for example, a harness 29.

The capacitance sensor unit 10 comprises a first sensing electrode 11 or an upper sensing electrode and a third sensing electrode 13 or a lower sensing electrode, which are formed on one face of a board 19, and a detection circuit 20 formed on another face of the board 19, and detects: a predetermined portion of a human body 48 sitting down on a seating portion 42 of the seat 40 (for example, any other portion than a head 49, such as a neck 48a, a shoulder 48b (see FIG. 6)); and the head (particularly, a parietal region 49a) of the human body. That is, the capacitance sensor unit 10 detects capacitances between the predetermined portion and head 49 of the human body 48 and the head restraint 43 (more specifically, between the head 49 and the first and third sensing electrodes 11 and 13).

The board 19 comprises, for example, a flexible printed board, a rigid board, or a rigid-flexible board. The first and third sensing electrodes 11 and 13 are formed of a conductive body such as copper, a copper alloy, or aluminum formed and patterned on the board 19 formed of an insulating body such as polyethylene terephthalate (PET), polyethylene naphthalate (PEN), polyimide (PI), polyamide (PA), or an epoxy resin.

The first and third sensing electrodes 11 and 13 are arranged, for example, in the front portion of the head restraint 43. The first sensing electrode 11 is arranged in an upper portion of the front portion while the third sensing electrode 13 is arranged in a lower portion of the front portion. Specifically, the first sensing electrode 11 is arranged at a position in the upper portion of the front portion of the head restraint 43, which is near the middle between both ends of the head restraint, which both ends are in a horizontal direction that is along a front face of the head restraint. The third sensing electrode 13 is arranged at a position in the lower portion of the front portion of the head restraint 43, which is near the middle between both ends of the head restraint, which both ends are in a horizontal direction that is along the front face.

Each of the sensing electrodes 11 and 13 is formed in a rectangular shape, and can sense the capacitance between itself and the predetermined portion or head 49 of the human body 48 sitting on the seat 40, whereby the position of the parietal region 49a of the head 49 (parietal region position) can be detected. The head restraint position adjusting device 100 detects the parietal region position of the head 49 by using the capacitance values indicated by the capacitances based on sensing signals from the sensing electrodes 11 and 13, and adjusts the position of the head restraint 43 relative to the seat 40 to an appropriate position for the head 49 that is based on the parietal region position.

The detection circuit 20 detects the aforementioned parietal region position of the head 49 based on the sensing signals from the first and third sensing electrodes 11 and 13 (i.e., by comparing the capacitance values indicated by the sensing signals from the sensing electrodes 11 and 13 with respect to each other). The first sensing electrode 11 mainly senses the capacitance in the vicinity of the parietal region 49a of the head 49, while the third sensing electrode 13 senses the capacitance of a portion of the human body 48 other than the parietal region 49a of the head 49 (such a portion is, for example, the neck 48a or the shoulder 48b).

Specifically, the detection circuit 20 detects the parietal region position by, for example, using a value, which is obtained by subtracting the capacitance value sensed by the first sensing electrode 11 from the capacitance value sensed by the third sensing electrode 13, as a comparison value, and determining whether this comparison value is included in a preset threshold range (i.e., whether the comparison value is higher or lower than the threshold range or included in that range).

Alternatively, the detection circuit 20 may detect the parietal region position by comparing the capacitance value sensed by the third sensing electrode 13 and the capacitance value sensed by the first sensing electrode 11, or by dividing a product between the capacitance value sensed by the third sensing electrode 13 and a constant by a product between the capacitance value sensed by the first sensing electrode 11 and another constant.

As shown in, for example, FIG. 3, the detection circuit 20 comprises: plural capacitance sensing circuits 21 and 23 which are connected to the first and third electrodes 11 and 13 in one-to-one correspondence, and which output information indicating the capacitances sensed by the sensing electrodes 11 and 13; and an arithmetic processing circuit 28 which is connected to the capacitance sensing circuits 21 and 23, calculates the parietal region position of the head 49 by using capacitance values based on the information output by the capacitance sensing circuits 21 and 23, and based on calculation result information, outputs a control signal for moving the head restraint 43 to an appropriate position for the head 49 or stopping the head restraint 43 to a motor drive circuit (not shown) of the drive motor unit 30.

The plural capacitance sensing circuits 21 and 23 respectively comprise: C-V conversion circuits 21a and 23a, which convert the capacitances sensed by the first and third sensing electrodes 11 and 13 to voltages; and A/D conversion circuits 21b and 23b, which convert analog signals indicative of the voltages from the C-V conversion circuits 21a and 23a to digital signals.

Each of the plural capacitance sensing circuits 21 and 23 generates a pulse signal having a duty ratio changing in accordance with the capacitance between the sensing electrode 11 and the head 49 of the human body 48 or between the sensing electrode 13 and the neck 48a or shoulder 48b of the human body 48, and outputs a sensing signal by smoothing the pulse signal. The arithmetic processing circuit 28 comprises, for example, a CPU, a FPGA, and the like, compares capacitance values, which are based on the sensing signals from the capacitance sensing circuits 21 and 23, with respect to each other to detect the parietal region position of the head 49, and outputs a control signal for changing the position of the head restraint 43, which is based on a calculation result, to the drive motor unit 30.

As shown in FIG. 4, each of the C-V conversion circuits 21a and 23a of the capacitance sensing circuits 21 and 23 changes its duty ratio in accordance with a capacitance C, and comprises: for example, a trigger signal generating circuit 101 which outputs a trigger signal TG with a constant period; a timer circuit 102 which outputs a pulse signal Po having a duty ratio changing in accordance with a largeness of the capacitance C connected to an input terminal; and a low-pass filter (LPF) 103 which performs smoothing on the pulse signal Po.

The timer circuit 102 comprises; for example, two comparators 201, 202, an RS flip-flop circuit (hereinafter, "RS-FF") 203 having a reset terminal R and a set terminal S into which outputs of the two comparators 201, 202 are respectively input, a buffer 204 which outputs an output DIS of the RS-FF 203 to the LPF 103, and a transistor 205 which is turned on/off by the output DIS from the RS-FF 203.

The comparator 202 compares the trigger signal TG shown in FIG. 5 and output by the trigger signal generating circuit 101 with a prescribed threshold Vth2 divided by resistors R1, R2, and R3, and outputs a set pulse synchronized with the trigger signal TG. The set pulse sets an output Q of the RS-FF 203.

The output Q turns off the transistor 205 as the discharge signal DIS, and electrically charges between the sensing electrode 11 or 13 and a ground at a speed defined by a time constant set by the grounded capacitance C of the sensing electrode 11 or 13 and a resistor R4 connected between the input terminal and a power-supply line. Accordingly, a potential of an input signal Vin increases at a speed defined by the capacitance C.

If the input signal Vin becomes larger than a threshold Vth1 defined by the resistors R1, R2, and R3, an output of the comparator 201 is inverted, and an output of the RS-FF 203 is also inverted. As a result, the transistor 205 turns on, and a charge trapped in the sensing electrode 11 or 13 is discharged through the transistor 205.

Therefore, as shown in FIG. 5, the timer circuit 102 outputs the pulse signal Po which oscillates at a duty ratio that is based on the capacitance C between the sensing electrode 11 or 13 and the head 49 or the neck 48a or shoulder 48b of the human body 48 which comes close thereto. The LPF 103 performs smoothing on this output, and outputs a direct-current sensing signal Vout as shown in FIG. 5.

The sensing signal Vout output by the C-V conversion circuit 21a or 23a is converted into a digital signal by the A/D conversion circuit 21b or 23b. Note that in FIG. 5, a waveform indicated by a solid line and a waveform indicated by a dotted line mean that the former has a smaller capacitance than latter, and for example, the latter represents a condition that an object comes close.

The drive motor unit 30 comprises: a motor drive circuit which, based on a control signal from the arithmetic processing circuit 28 that has calculated the parietal region position of the parietal region 49a of the head 49 based on the sensing signals Vout from the respective capacitance sensing circuits 21 and 23 in order for the head restraint 43 to be moved to an appropriate position for the head 49 that is based on the parietal region position or to be stopped, controls a non-illustrated drive motor to change a position of the head restraint 43 relative to the seat 40 to the aforementioned appropriate position; and the drive motor which actually changes the position of the head restraint 43 under the control of the motor drive circuit. To be specific, the drive motor drives a support shaft 43a of the head restraint 43 in a way that the support shaft 43a can freely move in the up and down direction, the left and right direction, and the back and forth direction.

In an initial condition before the head restraint 43 is started to be moved to the appropriate position, the drive motor unit 30 may move the head restraint 43 to, for example, an uppermost position relative to the seat 40 (a position at which the head restraint 43 is the most distant from the backrest 41) or a lowermost position relative to the seat 40 (a position at which the head restraint 43 is the closest to the backrest 41).

The head restraint position adjusting device 100 having this configuration operates in a way described below, for example. The following explanation will be given, for example on the basis that a value obtained by subtracting a capacitance value C1 sensed by the first sensing electrode 11 from a capacitance value C3 sensed by the third sensing electrode 13 is used as a comparison value CA (CA=C3−C1), and a prescribed threshold is referred to as threshold CB.

First, an operation of a case where the head restraint 43 is at the aforementioned lowermost position will be explained. As shown in FIG. 6(a), when the head restraint 43 is at the lowermost position, the first sensing electrode 11 is at a position that horizontally corresponds to the vicinity of a lower portion of the occipital region of the head 49 of the human body 48 while the third sensing electrode 13 is at a position that horizontally corresponds to the vicinity of the shoulder 48*b* below the neck 48*a*.

In this case, the sensing electrodes 11 and 13 are substantially equally distanced from the respective portions of the human body 48 (the vicinities of the head 49 and the shoulder 48*b*) as illustrated. Hence, the values of the capacitances C1 and C3 detected by the detection circuit 20 are almost equal as illustrated, and the comparison value CA is smaller than the threshold CB (comparison value CA<threshold CB). That is, when the head restraint 43 is under an appropriate position for the head 49, the comparison CA becomes smaller than the threshold CB.

When in such a condition, the head restraint 43 will be moved upward while the values of the capacitances C1 and C3 of the sensing electrodes 11 and 13 are monitored, and will be stopped when the comparison value CA becomes larger than the threshold CB. That is, for example, when the head restraint 43 is moved from the lowermost position upward to the position shown in FIG. 6(*b*), the first sensing electrode 11 comes at a position that horizontally corresponds to the vicinity of an upper portion of the occipital region of the head 49 of the human body 48, while the third sensing electrode 13 comes at a position that horizontally corresponds to the vicinity of the neck 48*a*.

In this case too, the sensing electrodes 11 and 13 are substantially equally distanced from the respective portions of the human body 48 (the vicinities of the head 49 and the neck 48*a*), and the values of the detected capacitances C1 and C3 are almost equal as illustrated. Therefore, the comparison value CA is smaller than the threshold CB (comparison value CA<threshold CB). This means that the head restraint 43 is still under the appropriate position for the head 49.

Then, when the head restraint 43 is further moved upward to the position shown in FIG. 6(*c*), the first sensing electrode 11 comes at a position (parietal region position) that horizontally corresponds to the vicinity of the parietal region 49*a* of the head 49 of the human body 48 while the third sensing electrode 13 comes at a position that horizontally corresponds to a lower portion of the occipital region of the head 49.

In this case, since the portion of the first sensing electrode 11 that is close to the head 49 shrinks to decrease the value of the capacitance C1 sensed by the first sensing electrode 11 while on the other hand, the value of the capacitance C3 sensed by the third sensing electrode 13 remains substantially the same as in the above case, the comparison value CA becomes larger than the threshold CB (comparison value CA>threshold CB). That is, when the head restraint 43 is at the appropriate position for the head 49, the comparison value CA becomes larger than the threshold CB.

When such a condition appears, the head restraint 43 is stopped from being moved upward, thereby the operation of position adjustment is completed. As long as the appropriate position of the head restraint 43 for the head 49 is set in advance based on the relationship between the positions of the sensing electrodes 11 and 13 and the threshold CB, the head restraint position adjusting device 100 can perform position adjustment towards the appropriate position by an operation in one direction (for example, the upward direction) only.

On the other hand, in an operation of a case where the head restraint 43 is at the aforementioned uppermost position, since the head restraint 43 is at the uppermost position as shown in FIG. 6(*d*), the first sensing electrode 11 is at a position that horizontally corresponds to the vicinity of a height far above the parietal region 49*a* of the head 49 of the human body 48, and the third sensing electrode 13 is at a position that horizontally corresponds to the vicinity of a lower portion of the occipital region of the head 49.

In this case, the value of the capacitance C1 sensed by the first sensing electrode 11 is very small as the first sensing electrode 11 is away from the head 49, whereas the value of the capacitance C3 sensed by the third sensing electrode 13 is, though depending on the distance from the third sensing electrode 13 to the human body 48, at least larger than the capacitance C1.

Therefore, the comparison value CA becomes larger than the threshold CB (comparison value CA>threshold CB), in which condition, the head restraint 43 will be moved downward while the values of the capacitances C1 and C3 of the sensing electrodes 11 and 13 are monitored, and will be stopped when the comparison value CA becomes smaller than the threshold CB.

That is, for example, when the head restraint 43 is moved from the uppermost position downward to the position shown in FIG. 6(*e*), the first sensing electrode 11 comes at a position (parietal region position) that horizontally corresponds to the vicinity of the parietal region 49*a* of the head 49 of the human body 48 while the third sensing electrode 13 comes at a position that horizontally corresponds to the vicinity of a lower portion of the occipital region of the head 49.

In this case, since the portion of the first sensing electrode 11 that is close to the head 49 grows to increase the value of the capacitance C1 sensed by the first sensing electrode 11 while on the other hand, the value of the capacitance C3 sensed by the third sensing electrode 13 remains substantially the same as in the above case, the comparison value CA becomes smaller than the threshold CB (comparison value CA<threshold CB).

When such a condition appears, the head restraint 43 is stopped from being moved downward, thereby the operation of position adjustment is completed. Hence, the head restraint position adjusting device 100 can adjust the position of the head restraint 43 to the appropriate position also by an operation in, for example, the downward direction only, not only in the upward direction only.

According to the head restraint position adjusting device 100, even when, for example, the head 49 of the human body 48 is away from the sensing electrodes 11 and 13 (i.e., when the head 49 is away from the head restraint 43) though this condition is not illustrated, the value of the capacitance C1 likewise becomes smaller than the value of the capacitance C3 when the first sensing electrode 11 comes at a position that horizontally corresponds to a height above the vicinity of the parietal region 49*a*, and the value of the capacitance C1 likewise becomes substantially equal to or larger than the value of the capacitance C3 when the first sensing electrode 11 comes at a position that horizontally corresponds to a height below the vicinity of the parietal region 49*a*.

Further, even when, for example, the shape of the occipital region of the head 49 of the human body 48 sitting on the seat 40 is substantially flat (i.e., when changes in the capacitances due to shape irregularity as in bosses and recesses are not often caused), the value of the capacitance C1 likewise changes relative to the value of the capacitance C3 when the first sensing electrode 11 comes at a position that horizontally corresponds to a height above or below the vicinity of the parietal region 49*a*.

Accordingly, also in these cases, it is likewise possible to adjust the position of the head restraint to the appropriate position for the head 49, by performing position adjustment using the comparison value CA based on the capacitances C1 and C3 and the threshold CB as described above. Note that it is sufficient to have the first sensing electrode 11 if the detection target is only the parietal region position of the parietal region 49a of the head 49, but providing the third sensing electrode 13 to compare the value of the capacitance C1 and the value of the capacitance C3 with respect to each other enables the head restraint 43 to be moved to the appropriate position for the head 49 in all kinds of cases such as when the distance between the seated human body 48 and the head restraint 43 changes, when the shape of the occipital region of the head 49 is not ordinary, etc.

FIG. 7 is a schematic diagram showing an example of a seat of a vehicle in which a head restraint position adjusting device according to the second embodiment of the present invention is arranged. FIG. 8 is an explanatory diagram showing an example arrangement of a part of the head restraint position adjusting device in a head restraint. FIG. 9 is a block diagram showing an example of a whole configuration of the head restraint position adjusting device. FIG. 10 is a block diagram showing another example of the whole configuration of the head restraint position adjusting device.

FIGS. 11 and FIGS. 12 are operation explanation diagrams for explaining operations of the head restraint position adjusting device. In the following, any portions that are the same as those already explained will be denoted by the same reference numerals and not be explained redundantly, and any matters that are not particularly essential to the present invention might not be explained.

As shown in FIG. 7 and FIG. 8, the head restraint position adjusting device 100 according to the second embodiment is different from the head restraint position adjusting device 100 according to the first embodiment in that the capacitance sensor unit 10 arranged mainly in the head restraint of the seat 40 comprises first to third sensing electrodes 11, 12, and 13, which are each formed in, for example, a rectangular shape.

Among these first to third sensing electrodes 11 to 13, the first and second sensing electrodes 11 and 12 or upper sensing electrodes are arranged at positions in an upper portion of the front portion of the head restraint 43, which positions are near both ends of the head restraint respectively, which both ends are in a horizontal direction that is along the front face of the head restraint, and the third sensing electrodes 13 or a lower sensing electrode is arranged at a position in a lower portion of the front portion of the head restraint 43, which position is near the middle between both ends of the head restraint, which both ends are in a horizontal direction that is along the front face.

Specifically, the first sensing electrode 11 is arranged at a position in an upper portion of the front portion of the head restraint 43, which position is near the left end in the horizontal direction along the front face of the head restraint (in an upper portion on the left hand side as seen from a counter side), while the second sensing electrode 12 is arranged at a position that is near the right end in the horizontal direction (in an upper portion on the right hand side as seen from a counter side). The third sensing electrode 13 is arranged at a position in a lower portion of the front portion of the head restraint 43, which position is near the middle between both ends of the head restraint, which both ends are in the horizontal direction along the front face.

The capacitance sensor unit 10 having this configuration comprises the first to third sensing electrodes 13 formed on one face of the board 19 and a detection circuit 20 formed on the other face of the board 19, and detects: a predetermined portion of a human body 48 sitting on a seating portion 42 of a seat 40 (for example, any other portion than a head, such as a neck 48a, a shoulder 48b (see FIG. 11)); and a head 49 (particularly, a parietal region 49a) of the human body.

Particularly, the respective sensing electrodes 11 to 13 may be configured to be able to detect a position of the parietal region 49a of the head 49 of the human body 48 sitting on the seat 40 (parietal region position) and the center position of the head 49 in the horizontal direction (the middle position between the left and right ends). Here, the head restraint position adjusting device 100 detects the parietal region position of the head 49 as in the first embodiment, by using capacitance values indicated by capacitances based on sensing signals from the sensing electrodes 11 to 13.

That is, as shown in FIG. 9, the detection circuit 20 detects the parietal region position of the head 49 by, for example, mainly sensing the capacitance in the vicinity of the parietal region 49a of the head 49 by means of the first and second sensing electrodes 11 and 12, and sensing the capacitance of a portion of the human body 48 other than the parietal region 49a of the head 49 by means of the third sensing electrode 13.

For example, the detection circuit 20 comprises: plural capacitance sensing circuits 21, 22, and 23, which are connected to the first to third sensing electrodes 11 to 13 in one-to-one correspondence and which output information indicating the capacitances sensed by the sensing electrodes 11 to 13; and an arithmetic processing circuit 28 that is connected to these capacitance sensing circuits 21 to 23. In this case, the capacitance sensing circuit 22 connected to the second sensing electrode 12 comprises a C-V conversion circuit 22a and an A/D conversion circuit 22b, like the other capacitance sensing circuits 21 and 23.

The detection circuit 20 may have a configuration as shown in FIG. 10, where among the sensing electrodes 11 to 13, the first and second sensing electrodes 11 and 12 are connected to one capacitance sensing circuit 21 and the third sensing electrode 13 is connected to one capacitance sensing circuit 23. That is, the head restraint position adjusting device 100 according to the second embodiment detects the parietal region position of the head 49 and adjusts the head restraint 43 to an appropriate position by comparing the values of the capacitances C1 and C3 in the vicinity of the upper portion of the head restraint 43 that are sensed by the first and second sensing electrodes 11 and 12 with the value of the capacitance C3 in the vicinity of the lower portion of the head restraint 43 that is sensed by the third sensing electrode 13. Hence, the sum of the values of the capacitances C1 and C2 sensed by the first and second sensing electrodes 11 and 12 respectively is used.

That is, the head restraint position adjusting device 100 according to the second embodiment is configured to operate by comparing, as a comparison value CA, a value obtained by subtracting the sum of the values of the capacitances C1 and C2 sensed by the first and second sensing electrodes 11 and 12 from the value of the capacitance C3 sensed by the third sensing electrode 13 (CA=C3−(C1+C2)) with a prescribed threshold CB.

In this way, by having the first and second sensing electrodes 11 and 12 arranged at the positions in the upper portion of the front portion of the head restraint 43 that are near the both ends in the horizontal direction, the head restraint position adjusting device 100 according to the second embodiment can acquire a good detection of the parietal region position and adjust the position of the head restraint 43 to the appropriate position even when the head 49 of the human body 48 sitting on the seat 40 comes out of alignment with the head restraint 43 to the left or right.

Specifically, in a case as shown in FIG. 12(a), in which case it is safe to say that the head 49 is near the center of the head restraint 43 in the left and right direction, the values of the capacitances C1 and C2 sensed by the first and second sensing electrodes 11 and 12 are substantially equal. And the sum of the capacitances C1+C2 obtained by adding these values together can be obtained.

In a case as shown in FIG. 12(b), where the head 49 comes out of balance leftward with respect to the head restraint 43, the value of the capacitance C1 sensed by the first sensing electrode 11 decreases while the value of the capacitance C2 sensed by the second sensing electrode 12 increases (C1<C2). Hence, the sum of the capacitances C1+C2 obtained by adding these values together is the same as when the head 49 is near the center in the left and right direction.

In a case as shown in FIG. 12(c), where the head 49 comes out of balance rightward with respect to the head restraint 43, the value of the capacitance C1 sensed by the first sensing electrode 11 increases while the value of the capacitance C2 sensed by the second sensing electrode 12 decreases (C1>C2). Hence, the sum of the capacitances C1+C2 obtained by adding these values together is the same as when the head 49 is near the center in the left and right direction.

The value of the capacitance C3 sensed by the third sensing electrode 13 is uniform among the all the cases shown in FIGS. 12(a) to (c), because even when the head 49 comes out of balance in the left and right direction, it shifts leftward or rightward as starting from the neck 48a as a base position. The value of the capacitance C3 is compared with the sum of the capacitances C1+C2 so that the parietal region position can be detected and the head restraint 43 can be favorably moved to the appropriate position.

In this way, the head restraint position adjusting device 100 according to the above-described first and second embodiments can detect the position of the parietal region 49a of the head 49 by moving the head restraint 43 only in one direction from the above-described initial condition (where the head restraint 43 is at the lowermost position or the uppermost position), and place the head restraint 43 securely at the appropriate position for the head 49 that is based on the position of the parietal region 49a.

Therefore, it becomes possible to move the head restraint 43 to the appropriate position highly precisely within a short time irrespective of the distance between the head 49 of the human body 48 and the head restraint 43 and the shape of the head 49. Hence, it is possible to suppress any accident like cervical spine injury of the human body 48 when a vehicle collides under a condition in which a position of the head restraint 43 is not adjusted.

Note that the capacitance sensor unit 10 and the drive motor unit 30 in the head restraint position adjusting device 100 are connected together via the harness 29, but the drive motor unit 30 may be controlled in a wireless manner or the like. Moreover, the drive motor unit 30 may be built together with the capacitance sensor unit 10, and may be arranged in the head restraint 43.

In the head restraint position adjusting device 100 according to the first and second embodiments, it has been explained that the configuration of the detection circuit 20 for detecting the parietal region position of the head 49 based on sensed capacitances is by means of a well-known timer IC in the C-V conversion circuit 21a (22a, 23a) of the capacitance sensing circuit 21 (22, 23), which outputs a pulse having a duty ratio changing based on resistors and a capacitor. However, the present invention is not limited to this.

That is, for example, there may be a manner of directly measuring an impedance, a manner of using an oscillation circuit to measure an oscillation frequency, a manner of using an RC charge/discharge circuit to measure a time period of charge/discharge, a manner of moving a charge, which is accumulated by electrical charging under a known voltage, to a known capacity to measure the voltage of the charge, a manner of performing moving a charge a plurality of times to count the number of times taken until a known capacity is charged with a predetermined voltage. Then, a threshold may be set for a capacitance value to be detected in these manners, or the waveform of the capacitance may be analyzed such that when a corresponding capacitance waveform appears, a triggering operation may begin.

It has been the premise that the C-V conversion circuit 21a (22a, 23a) of the capacitance sensing circuit 21 (22, 23) converts a capacitance to a voltage. However, it may convert a capacitance to any data that is easy to process electrically or by software, and may convert it to, for example, a pulse width, or directly to a digital value.

Furthermore, the above-described second embodiment has been explained with an example in which the first to third sensing electrodes 11 to 13 are arranged and a value obtained by subtracting the sum of the capacitances C1+C2 from the value of the capacitance C3 is used as the comparison value CA. This example may also be configured as follows.

FIG. 13 is an explanatory diagram showing another example of a configuration of a part of the head restraint position adjusting device according to the second embodiment. As shown in FIG. 13, the detection circuit in this example performs differential operations, with, for example, the third sensing electrode 13 connected to a plus-side input terminal, and the first and second sensing electrodes 11 and 12 connected to a minus-side input terminal. The detection circuit may subtract the sum of the capacitances C1+C2 from the capacitance C3, and compare the resulting output value (i.e., the comparison value CA) with the threshold CB by means of a comparator or the like to detect the parietal region position of the head 49, and determine an appropriate position of the head restraint 43.

Such a detection circuit 20 operates in a manner of, for example, when switches S1 are opened (OFF), switches S2 are grounded (GND), and switches S3 are closed (ON), opening the switches S3 (OFF), switching the switches S2 to Vr, and connecting the switches S1 to inverting inputs of operational amplifiers to thereby cause the capacitance C3 and a capacitance Cf to be charged with C3Vr and the capacitances C1 and C2 and a capacitance Cr to be charged with (C1+C2) Vr.

Then, after the switches S1 are opened (OFF) and the switches S2 are grounded (GND), a voltage V when the switches S1 are grounded (GND) is measured. The voltage at this time is, for example, $V/Vr=\{(Cf+C3)/Cf\}-\{(Cf+C1+C2)/Cf\}$, which means that a voltage corresponding to the ratio between the capacitance C3 and the capacitances C1+C2 has been output. Hence, it is likewise possible to detect the parietal region position and adjust the head restraint 43 to an appropriate position.

The head restraint 43 or the backrest 41 may internally include a metallic member. When the head restraint 43 moves, the positional relationship between the metallic member and the first to third sensing electrodes 11 to 13 changes, which might cause a malfunction, because capacitance changes might be detected in accordance with this external condition change.

In order to remove such an influence, though not illustrated, auxiliary electrodes (shield electrodes) for suppressing such capacitance changes may be provided in an internal side (i.e., a rear portion) of the head restraint 43 that is opposite to the front portion of the head restraint 43 where the sensing electrodes 11 to 13 are provided, or alternatively, in addition to being provided on this place, may be provided on a place near the backrest 41 and near the sensing electrodes 11 to 13 (particularly, the third sensing electrode 13).

In this case, it is only necessary that the respective shield electrodes be given a potential equal to that of the first to third sensing electrodes 11 to 13. For example, an equal potential may be generated by passing the potentials applied to the sensing electrodes 11 to 13 through a unity amplifier (buffer) at a high input impedance. In the case of the detection circuit 20 shown in FIG. 13, an equal potential can be given to the shield electrodes if the non-inverting input portion of the operational amplifier is connected to the shield electrodes.

Next, a head restraint position adjusting device and a head restraint position adjusting method according to the third embodiment of the present invention will be explained. The configuration, operation, etc. of the head restraint position adjusting device 100 according to the third embodiment are the same as shown in FIG. 7 to FIG. 13, the following explanation will be given with reference to these diagrams.

As shown in FIG. 7 and FIG. 8, the head restraint position adjusting device 100 according to the third embodiment comprises a capacitance sensor unit 10 and a drive motor unit 30, like the head restraint position adjusting device 100 according to the above-described second embodiment. The capacitance sensor unit 10 comprises first to third sensing electrodes 11 to 13, a board 19, and a detection circuit 20, which are arranged like in the above-described configuration.

These first to third sensing electrodes 11 to 13 can sense capacitances between themselves and a predetermined portion or a head 49 of a human body 48 sitting down on a seat 40, and detect the position of a parietal region 49a of the head 49 (parietal region position) and the center position of the head 49 in the horizontal direction (a middle position between left and right ends).

Then, the head restraint position adjusting device 100 according to the third embodiment detects the parietal region position of the head 49 and the center position thereof in the horizontal direction by using capacitance values indicated by capacitances based on sensing signals from the sensing electrodes 11 to 13, and adjusts the position of the head restraint 43 relative to the seat 40 to an appropriate position for the head 49 based on the parietal region position and the center position in the horizontal direction.

As shown in FIG. 9, the detection circuit 20 detects the aforementioned position of the parietal region 49a of the head 49 based on sensing signals from the sensing electrodes 11 to 13 (i.e., for example, by comparing the values of capacitances indicated by the sensing signals from the sensing electrodes 11 to 13 with respect to each other). Furthermore, the detection circuit 20 detects the aforementioned center position of the head 49 in the horizontal direction based on sensing signals from the first and second sensing electrodes 11 and 12 in an upper portion of the front portion of the head restraint 43 (i.e., for example, by comparing the values of capacitances indicated by the sensing signals from the sensing electrodes 11 and 12 with respect to each other).

In the head restraint position adjusting device 100 according to the third embodiment, the first and second sensing electrodes 11 and 12 mainly sense capacitances in the vicinity of the parietal region 49a of the head 49, while the third sensing electrode 13 senses a capacitance of a portion of the human body 48 other than the parietal region 49a of the head 49 (such a portion may be, for example, a neck 48a or a shoulder 48b).

Specifically, like in the head restraint position adjusting device 100 according to the above-described first embodiment, for example, the detection circuit 20 detects the parietal region position by using a value obtained by subtracting a capacitance value sensed by the first sensing electrode 11 from a capacitance value sensed by the third sensing electrode 13 as a comparison value, and determining whether this comparison value is included in a preset threshold range (that is, whether the comparison value is higher or lower than the threshold range or included in that range). The other detection manners are the same as those described above, and will not be explained here.

Then, for example, after the parietal region position is detected, the detection circuit 20 detects the center position of the head 49 in the horizontal direction, by comparing the capacitance values sensed by the first and second sensing electrodes 11 and 12 by, for example, determining whether the capacitance values are equal.

As shown in, for example, FIG. 9, the detection circuit 20 has plural capacitance sensing circuits 21 to 23 connected to the sensing electrodes 11 to 13 in one-to-one correspondence, and comprises an arithmetic processing circuit 28, which calculates the parietal region position of the head 49 and the center position thereof in the horizontal direction by using capacitance values based on information output by the capacitance sensing circuits 21 to 23, and based on calculation result information, outputs a control signal for moving the head restraint 43 to an appropriate position for the head 49 or for stopping the head restraint 43 to the driver motor unit 30.

The internal configuration, operation, operation waveforms, etc. of the capacitance sensing circuits 21 to 23 and C-V conversion circuits 21a to 23a of the detection circuit 20 are the same as those described above, and will not therefore be explained here. The configuration and operation of the drive motor unit 30 are the same as those described above, and hence will not be explained here.

The head restraint position adjusting device 100 according to the third embodiment having such a configuration operates as follows, for example. The following explanation may include matters that are the same as in the explanation for the first and second embodiments, but which will be explained in detail. That is, the explanation will be given, for example, on the basis that a value obtained by subtracting the sum of a capacitance value C1 sensed by the first sensing electrode 11 and a capacitance value C2 sensed by the second sensing electrode 12 from a capacitance value C3 sensed by the third sensing electrode 13 is used as a comparison value CA (CA=C3−(C1+C2)), and a prescribed threshold is referred to as threshold CB.

First, an operation of position adjustment for the head restring 43 in the up and down direction will be explained. Here, an operation of a case where the head restraint 43 is at the aforementioned lowermost position will be explained. As shown in FIG. 11 (a), when the head restraint 43 is at the lowermost position, the first and second sensing electrodes 11 and 12 are at positions that horizontally correspond to the vicinity of a lower portion of the occipital region of the head 49 of the human body 48 while the third sensing electrode 13 is at a position that horizontally corresponds to the vicinity of the shoulder 48b below the neck 48a.

In this case, though actually the first and second sensing electrodes 11 and 12, which are at both ends of the head restraint 43 respectively, are distanced farther than the third sensing electrode 13 is, the sensing electrodes 11 to 13 are substantially equally distanced from the respective portions of the human body 48 (the vicinities of the head 49 and the shoulder 48b) as illustrated, as long as they are observed from their side. Hence, in the example shown in FIG. 11(a), the values of the capacitances C1+C2 and C3 detected by the detection circuit 20 are almost equal as illustrated, and the comparison value CA is smaller than the threshold CB (comparison value CA<threshold CB). That is, when the head restraint 43 is under an appropriate position for the head 49, the comparison CA becomes smaller than the threshold CB.

When in such a condition, the head restraint 43 will be moved upward while the values of the capacitances C1 to C3 of the sensing electrodes 11 to 13 are monitored, and will be stopped when the comparison value CA becomes larger than the threshold CB. That is, for example, when the head restraint 43 is moved from the lowermost position upward to the position shown in FIG. 11(b), the first and second sensing electrodes 11 and 12 come at positions that horizontally correspond to the vicinity of an upper portion of the occipital region of the head 49 of the human body 48, while the third sensing electrode 13 comes at a position that horizontally corresponds to the vicinity of the neck 48a.

In this case too, the sensing electrodes 11 to 13 are substantially equally distanced from the respective portions of the human body 48 (the vicinities of the head 49 and the neck 48a), and the values of the detected capacitances C1 to C3 are almost equal, as illustrated and like as described above. Therefore, the comparison value CA is smaller than the threshold CB (comparison value CA<threshold CB). This means that the head restraint 43 is still under the appropriate position for the head 49.

Then, when the head restraint 43 is further moved upward to the position shown in FIG. 11(c), the first and second sensing electrodes 11 and 12 come at positions (parietal region position) that horizontally correspond to the vicinity of the parietal region 49a of the head 49 of the human body 48 while the third sensing electrode 13 comes at a position that horizontally corresponds to a lower portion of the occipital region of the head 49.

In this case, since the portions of the first and second sensing electrodes 11 and 12 that are close to the head 49 shrinks to decrease the values of the capacitances C1 and C2 sensed by the first and second sensing electrodes 11 and 12 while on the other hand, the value of the capacitance C3 sensed by the third sensing electrode 13 remains substantially the same as in the above case, the comparison value CA becomes larger than the threshold CB (comparison value CA>threshold CB). That is, when the head restraint 43 is at the appropriate position for the head 49, the comparison value CA becomes larger than the threshold CB.

When such a condition appears, the head restraint 43 is stopped from being moved upward, thereby the operation of position adjustment for the head restraint 43 in the upward direction is completed. As long as a position, in the up and down direction, of the head restraint 43 relative to the head 49 is set in advance based on the relationship between the positions of the sensing electrodes 11 to 13 and the threshold CB, the head restraint position adjusting device 100 according to the third embodiment can perform position adjustment by an operation in one direction (for example, the upward direction) only.

On the other hand, in an operation of a case where the head restraint 43 is at the aforementioned uppermost position, since the head restraint 43 is at the uppermost position as shown in FIG. 11(d), the first and second sensing electrodes 11 and 12 are at positions that horizontally correspond to the vicinity of a height far above the parietal region 49a of the head 49 of the human body 48, and the third sensing electrode 13 is at a position that horizontally corresponds to the vicinity of a lower portion of the occipital region of the head 49.

In this case, the value of the capacitances C1+C2 sensed by the first and second sensing electrodes 11 and 12 is very small as the first and second sensing electrodes 11 and 12 are away from the head 49, whereas the value of the capacitance C3 sensed by the third sensing electrode 13 is, though depending on the distance from the third sensing electrode 13 to the human body 48, at least larger than the capacitances C1+C2.

Therefore, the comparison value CA becomes larger than the threshold CB (comparison value CA>threshold CB), in which condition, the head restraint 43 will be moved downward while the values of the capacitances C1+C2 and C3 of the sensing electrodes 11 to 13 are monitored, and will be stopped when the comparison value CA becomes smaller than the threshold CB.

That is, for example, when the head restraint 43 is moved from the uppermost position downward to the position shown in FIG. 11(e), the first and second sensing electrodes 11 and 12 come at positions (parietal region position) that horizontally correspond to the vicinity of the parietal region 49a of the head 49 of the human body 48 while the third sensing electrode 13 comes at a position that horizontally corresponds to the vicinity of a lower portion of the occipital region of the head 49.

In this case, since the portions of the first and second sensing electrodes 11 and 12 that are close to the head 49 grows to increase the value of the capacitances C1+C2 sensed by the first and second sensing electrodes 11 and 12 while on the other hand, the value of the capacitance C3 sensed by the third sensing electrode 13 remains substantially the same as in the above case, the comparison value CA becomes smaller than the threshold CB (comparison value CA<threshold CB).

When such a condition appears, the head restraint 43 is stopped from being moved downward, thereby the operation of position adjustment for the head restraint 43 in the downward direction is completed. Hence, the head restraint position adjusting device 100 according to the third embodiment can also perform position adjustment also by an operation in one direction, for example, the downward direction only, not only in the upward direction only, which is described above.

Next, an operation of position adjustment for the head restraint 43 in the left and right direction, which is after the position, in the up and down direction, of the head restraint 43 is determined, will be explained. When the position, in the up and down direction, of the head restraint 43 is determined, the capacitance values C1 and C2 from the first and second sensing electrodes 11 and 12 are compared. Specifically, in a case as shown in, for example, FIG. 12(a), in which case it is safe to say that the head 49 is near the center of the head restraint 43 in the left and right direction, the values of the capacitances C1 and C2 sensed by the first and second sensing electrodes 11 and 12 are substantially equal (C1≈C2). Hence, on a determination that the head 49 is at the center position in the horizontal direction, the operation for the head restraint 43 in the left and right direction will not be performed, and position adjustment towards an appropriate position will be terminated.

On the other hand, when the head 49 comes out of balance leftward with respect to the head restraint 43 as shown in FIG. 12(b), the value of the capacitance C1 sensed by the first sensing electrode 11 decreases while the value of the capacitance C2 sensed by the second sensing electrode 12 increases (C1<C2). Hence, the head restraint 43 is moved leftward and stopped at a position at which the values of the capacitances C1 and C2 become substantially equal, such that the position adjustment is completed when the head restraint 43 is stopped at the center position of the head 49 in the horizontal direction.

Further, when the head 49 comes out of balance rightward with respect to the head restraint 43 as shown in FIG. 12(c), the value of the capacitance C2 sensed by the second sensing electrode 12 decreases while the value of the capacitance C1 sensed by the first sensing electrode 11 increases (C1>C2). Hence, the head restraint 43 is moved rightward and stopped at a position at which the values of the capacitances Cl and C2 become substantially equal, such that the position adjustment is completed when the head restraint 43 is stopped at the center position of the head 49 in the horizontal direction.

In this way, the head restraint position adjusting device 100 according to the third embodiment can adjust the position of the head restraint 43 to the appropriate position for the head 49 in one operation in the up and down direction and in the left and right direction. Note that by having the first to third sensing electrodes 11 to 13 arranged in the upper portion and lower portion of the front portion of the head restraint 43 in the above-described arrangement, the head restraint position adjusting device 100 according to the third embodiment can effectively perform position adjustment also in the following cases.

That is, even when, for example, the head 49 of the human body 48 is away from the sensing electrodes 11 to 13 (i.e., when the head 49 is away from the head restraint 43) though this condition is not illustrated, the value of the capacitances C1+C2 likewise becomes smaller than the value of the capacitance C3 when the first and second sensing electrodes 11 and 12 come at positions that horizontally correspond to a height above the vicinity of the parietal region 49a. Besides, the value of the capacitances C1+C2 likewise becomes substantially equal to or larger than the value of the capacitance C3 when the first and second sensing electrodes 11 and 12 come at positions that horizontally correspond to a height below the vicinity of the parietal region 49a.

Further, even when, for example, the shape of the occipital region of the head 49 of the human body 48 sitting on the seat 40 is substantially flat (i.e., when changes in the capacitances due to shape irregularity as in bosses and recesses are not often caused), the value of the capacitances C1+C2 likewise changes relative to the value of the capacitance C3 when the first and second sensing electrodes 11 and 12 come at positions that horizontally correspond to a height above or below the vicinity of the parietal region 49a.

Once the position, in the up and down direction, of the head restraint 43 is determined by detecting the parietal region position in this manner, it is only necessary thereafter to compare the values of the capacitances C1 and C2 from the first and second sensing electrodes 11 and 12, in order to detect the position of the head restraint 43 in the left and right direction (horizontal direction) and to adjust the position of the head restraint 43 to the appropriate position for the head 49. Therefore, in even such cases as above, by performing position adjustment by using the comparison value CA that is based on the capacitances C1 to C3 and the threshold CB and further the capacitance values C1 and C2, it is possible to adjust the position of the head restraint 43 securely to the appropriate position for the head 49 precisely in a short time.

Similarly to the head restraint position adjusting device 100 according to the above-described second embodiment, it is sufficient to have one sensing electrode provided in an upper portion of the front portion of the head restraint 43 if the detection target is, for example, only the parietal region position of the parietal region 49a of the head 49, but using the values of the capacitances C1 to C3 in the way described above (for example, comparing the value of the capacitances C1+C2 and the value of the capacitance C3 with respect to each other, etc.) enables the head restraint 43 to be moved to the appropriate position for the head 49 in the up and down direction and in the left and right direction in all kinds of cases such as when the distance between the seated human body 48 and the head restraint 43 changes, when the shape of the occipital region of the head 49 is not ordinary, etc.

FIG. 14 is a block diagram showing an example of a whole configuration of a head restraint position adjusting device according to the fourth embodiment of the present invention. As shown in FIG. 14, the detection circuit 20A of the head restraint position adjusting device according to the fourth embodiment is different from the detection circuit 20 in the preceding examples, in that it comprises two capacitance sensing circuits 21 and 23 and three switches SW1, SW2, and SW3, and the second and third sensing electrodes 12 and 13 are connected to the capacitance sensing circuits 21 and 23 via these switches SW1 to SW3.

Specifically, in the detection circuit 20A, the first sensing electrode 11 is directly connected to the capacitance sensing circuit 21, and the second sensing electrode 12 is connected thereto via the switch SW1. The second sensing electrode 12 is also connected to the capacitance sensing circuit 23 via the switch SW2, and the third sensing electrode 13 is connected to the capacitance sensing circuit 23 via the switch SW3.

These switches SW1 to SW3 are constituted by an electrical switch such as a FET (field effect transistor), or a mechanical switch such as a relay switch. Control lines (not shown) for the respective switches SW1 to SW3 are connected to, for example, the arithmetic processing unit 28 respectively.

When performing position adjustment for the head restraint 43 in the up and down direction with this detection circuit 20A, first, the switches SW1 and SW3 are closed (ON), and the switch SW2 is opened (OFF). Thereby, the first and second sensing electrodes 11 and 12 are connected together to the capacitance sensing circuit 21, and the third sensing electrode 13 is connected to the capacitance sensing circuit 23.

Then, for performing an operation of position adjustment, a process similar to the process explained in the above-described third embodiment is performed by using a value, which is obtained by subtracting a capacitance value CN detected by the capacitance sensing circuit 21 from a capacitance value CM detected by the capacitance sensing circuit 23, as a comparison value CA (CA=CM−CN), and a value, which is set in advance, as a threshold CB.

That is, when performing position adjustment by moving the head restraint 43 upward from the lowermost position, the position in the up and down direction is determined by stopping the head restraint 43 from being moved upward when the comparison value CA becomes equal to or larger than the threshold CB (or when it becomes larger than the threshold CB). When performing position adjustment by moving the head restraint 43 downward from the uppermost position, the position in the up and down direction is determined by stopping the head restraint 43 from being moved downward when the comparison value CA becomes smaller than the threshold CB (or when it becomes equal to or smaller than the threshold CB).

When the position of the head restraint 43 in the up and down direction is determined, the switches SW1 and SW3 are then opened (OFF), and the switch SW2 is closed (ON). Thereby, the first sensing electrode 11 is connected to the capacitance sensing circuit 21, the second sensing electrode 12 is connected to the capacitance sensing circuit 23, and the third sensing electrode 13 is opened (OFF).

For example, when the comparison value CA takes a positive value in this condition, the head restraint 43 is moved to the direction of the second sensing electrode 12 (i.e., in the leftward direction), while when the comparison value takes a negative value, it is moved to the direction of the first sensing electrode 11 (i.e., in the rightward direction). It is possible to adjust the position of the head restraint 43 to an appropriate position, by stopping the head restraint 43 when the absolute value of the comparison value CA becomes equal to or smaller than the threshold CB.

FIG. 15 is a block diagram showing an example of a whole configuration of a head restraint position adjusting device according to the fifth embodiment of the present invention. As shown in FIG. 15, the detection circuit 20B of the head restraint position adjusting device according to the fifth embodiment is different from the detection circuit 20A in the preceding example, in that it performs differential operations, and comprises one capacitance sensing circuit 99 and three switches SW1 to SW3.

Specifically, in the detection circuit 20B, the first sensing electrode 11 is connected to a minus-side input terminal of a C-V conversion circuit 99a of the capacitance sensing circuit 99, and the second sensing electrode 12 is connected likewise to the minus-side input terminal via the switch SW1. The second sensing electrode 12 is also connected to a plus-side input terminal of the C-V conversion circuit 99a via the switch SW2. The third sensing electrode 13 is likewise connected to the plus-side input terminal via the switch SW3.

When performing position adjustment for the head restraint 43 in the up and down direction with this detection circuit 20B, first, the switches SW1 and SW3 are closed (ON), and the switch SW2 is opened (OFF) to thereby connect the first and second sensing electrodes 11 and 12 together to the minus-side input terminal of the C-V conversion circuit 99a and connect the third sensing electrode 13 to the plus-side input terminal.

Then, for performing an operation of position adjustment, a process similar to the process explained in the fourth and fifth embodiment is performed by the arithmetic processing circuit 28 monitoring an output voltage V, which is obtained by subtracting a value detected at the minus-side input terminal from a value obtained by adding a value detected at the plus-side input terminal to a predetermined center voltage, and comparing the output voltage V with a threshold Vth.

That is, when performing position adjustment by moving the head restraint 43 upward from the lowermost position, the position in the up and down direction is determined by stopping the head restraint 43 from being moved upward when the output voltage V becomes equal to or larger than the threshold Vth (or when it becomes larger than the threshold Vth). When performing position adjustment by moving the head restraint 43 downward from the uppermost position, the position in the up and down direction is determined by stopping the head restraint 43 from being moved downward when the output voltage V becomes smaller than the threshold Vth (or when it becomes equal to or smaller than the threshold Vth).

When the position in the up and down direction is determined, the switches SW1 and SW3 are then opened (OFF), and the switch SW2 is closed (ON) to thereby connect the first sensing electrode 11 to the minus-side input terminal of the C-V conversion circuit 99a and connect the second sensing electrode 12 to the plus-side input terminal. When a value obtained by subtracting a predetermined center voltage from the output voltage V takes a positive value in this condition, the head restraint 43 is moved to the direction of the second sensing electrode 12, while when the value takes a negative value, it is moved to the direction of the first sensing electrode 11. It is possible to adjust the position of the head restraint 43 to an appropriate position, by stopping the head restraint 43 when the absolute value of the output voltage V becomes equal to or smaller than the threshold Vth.

In this way, the head restraint position adjusting device according to the above-described third to fifth embodiments detects the position of the parietal region 49a of the head 49 by moving the head restraint 43 only in one of the up and down directions from the aforementioned initial condition (a condition in which the head restraint 43 is the lowermost position or the uppermost position), and detects the center position of the head 49 in the horizontal direction by moving the head restraint 43 only in one of the left and right directions. And the head restraint position adjusting device can move the head restraint 43 securely to the appropriate position for the head 49 that is based on these detected positions.

Similarly to the effect of the head restraint position adjusting device 100 according to the first and second embodiments, the head restraint 43 can be moved to the appropriate position precisely in a short time regardless of the distance between the head 49 of the human body 48 and the head restraint 43 and the shape of the head 49. This makes it possible to suppress any accident like cervical spine injury of the human body 48 when a vehicle collides under a condition in which a position of the head restraint 43 is not adjusted.

In connection with the head restraint position adjusting devices according to the third to fifth embodiments, examples that use three sensing electrodes (first to third sensing electrodes 11 to 13) have been explained. However, these head restraint position adjusting devices may be configured as follows for example.

FIG. 16 is an explanatory diagram for explaining an example of a head restraint position adjusting device having another configuration. The head restraint position adjusting device of this example further comprises fourth and fifth sensing electrodes 14 and 15 in the head restraint 43 under the above-described first and second sensing electrodes 11 and 12, and differentially operates at least part of the detection circuit 20 by, for example, connecting the fourth sensing electrode 14 to a minus-side input terminal while connecting the fourth sensing electrode 15 to a plus-side input terminal, subtracting a value of a capacitance C4 from a value of a capacitance C5, and comparing the resulting output value with a threshold by means of a comparator or the like, to thereby detect the center position of the head 49 in the horizontal direction.

Such a detection circuit 20 operates in a manner of, for example, when switches S1 are opened (OFF), switches S2 are grounded (GND), and switches S3 are closed (ON), opening the switches S3 (OFF), switching the switches S2 to Vr, and connecting the switches S1 to inverting inputs of operational amplifiers to thereby cause the capacitance C5 and a capacitance Cf to be charged with C5Vr and the capacitance C4 and a capacitance Cr to be charged with C4Vr.

Then, after the switches S1 are opened (OFF) and the switches S2 (GND) are grounded (GND), a voltage V when the switches S1 are grounded (GND) is measured. The voltage at this time is $V/Vr=\{(Cf+C5)/Cf\}-\{(Cf+C4)/Cf\}$, which means that a voltage corresponding to the ratio between the capacitance C5 and the capacitance C4 has been output. Hence, it is likewise possible to detect the center position in the horizontal direction.

When a metallic member is used inside the head restraint 43 or the backrest 41 and hence the first to third sensing electrodes 11 to 13 (including the fourth and fifth sensing electrodes 14 and 15 when they are provided) are subject to the influence of capacitance change due to this external condition change, auxiliary electrodes (shield electrodes) as described above may be provided.

In the above-described first to fifth embodiments, explanation has been given by raising examples in which the head restraint adjusting device 100 is applied to the head restraint 43 of the seat 40 of a vehicle. However, the head restraint position adjusting device and head restraint position adjusting method according to the present invention can also be applied to various kinds of seats (e.g., an attraction vehicle seat, a theater seat, a massage chair, etc.) that have a position-adjustable head restraint.

Industrial Applicability

The present invention is useful for a device, which adjusts a position of a head restraint of a seat provided in a vehicle like an automobile, to particularly perform highly precise position adjustment in a short time.

Figure 1:
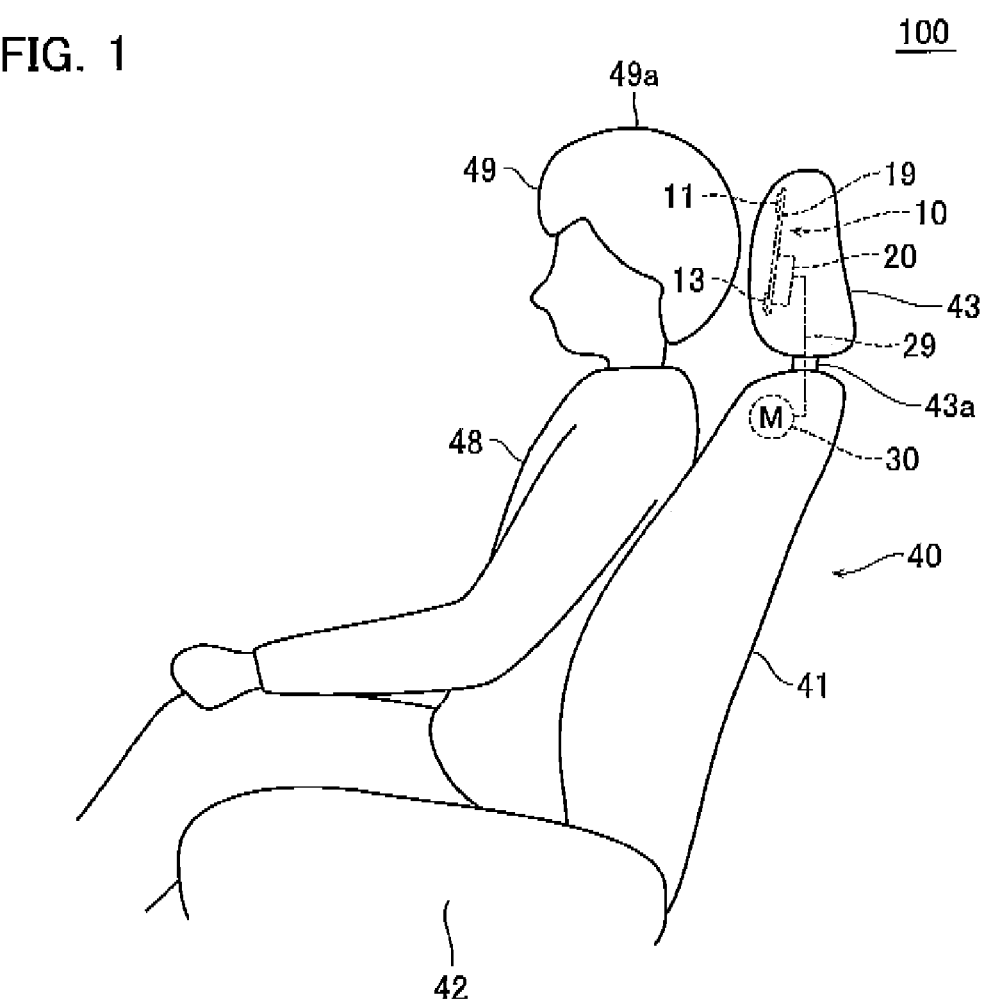
FIG. 1 is a schematic diagram showing an example of a seat in a vehicle provided with a head restraint position adjusting device according to a first embodiment of the present invention.
Figure 2:
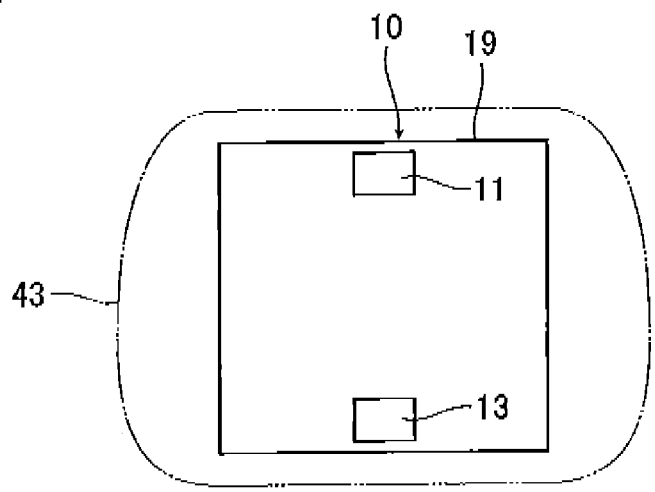
FIG. 2 is an explanatory diagram showing an example arrangement of a part of the head restraint position adjusting device in a head restraint.
Figure 3:
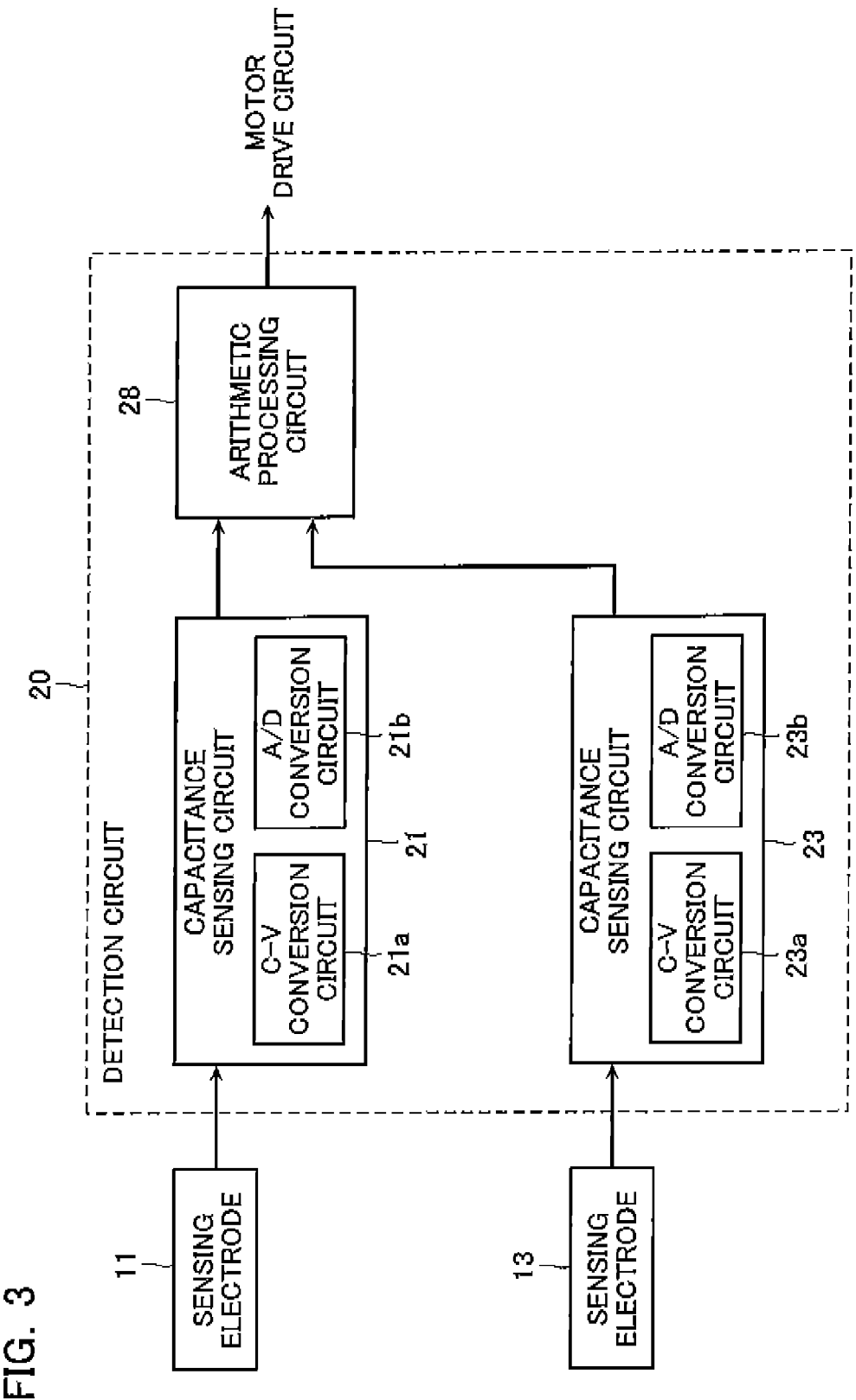
FIG. 3 is a block diagram showing an example of a whole configuration of the head restraint position adjusting device.
Figure 4:
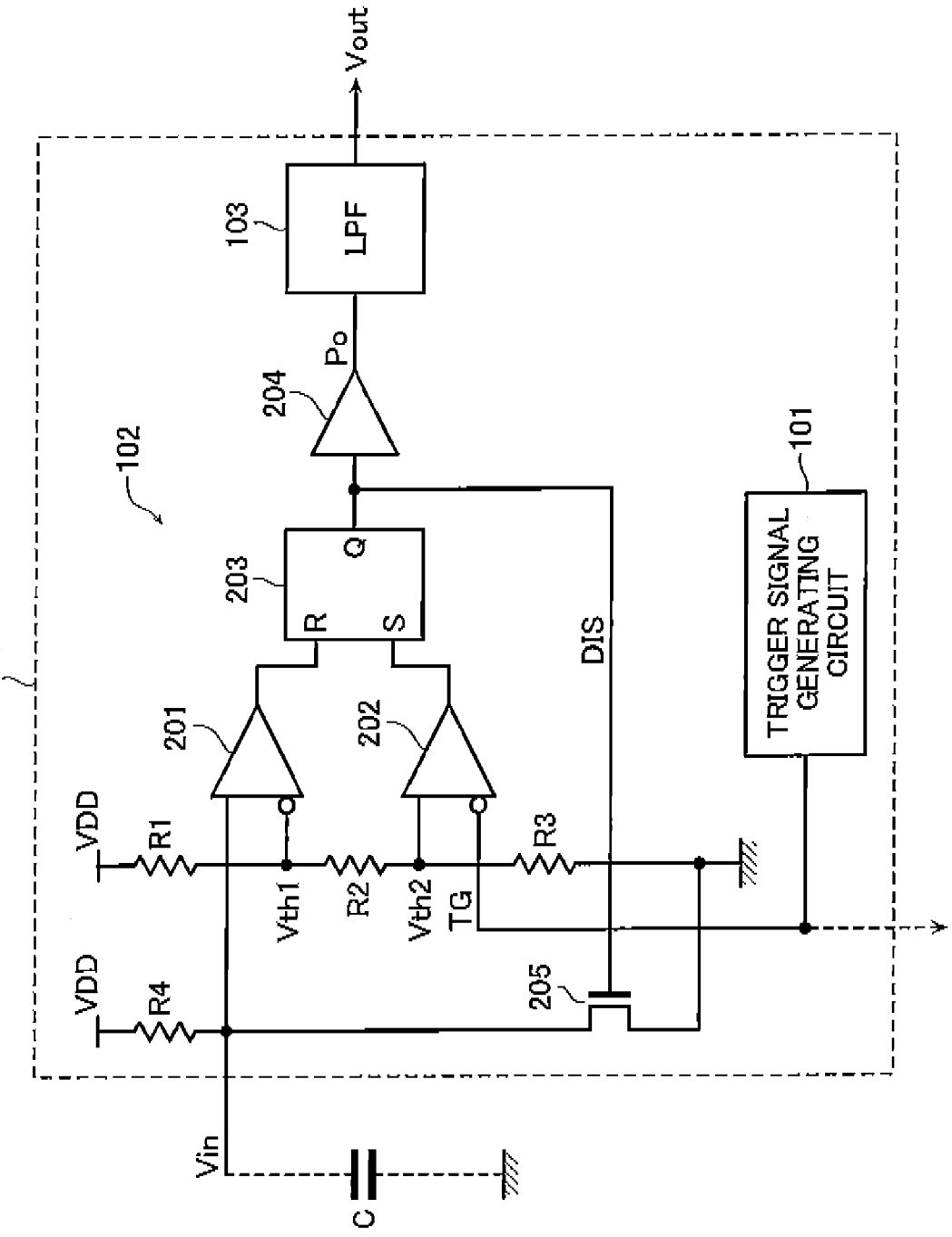
FIG. 4 is a block diagram showing an example configuration of a C-V conversion circuit in a capacitance sensing circuit of a detection circuit of the head restraint position adjusting device.
Figure 5:
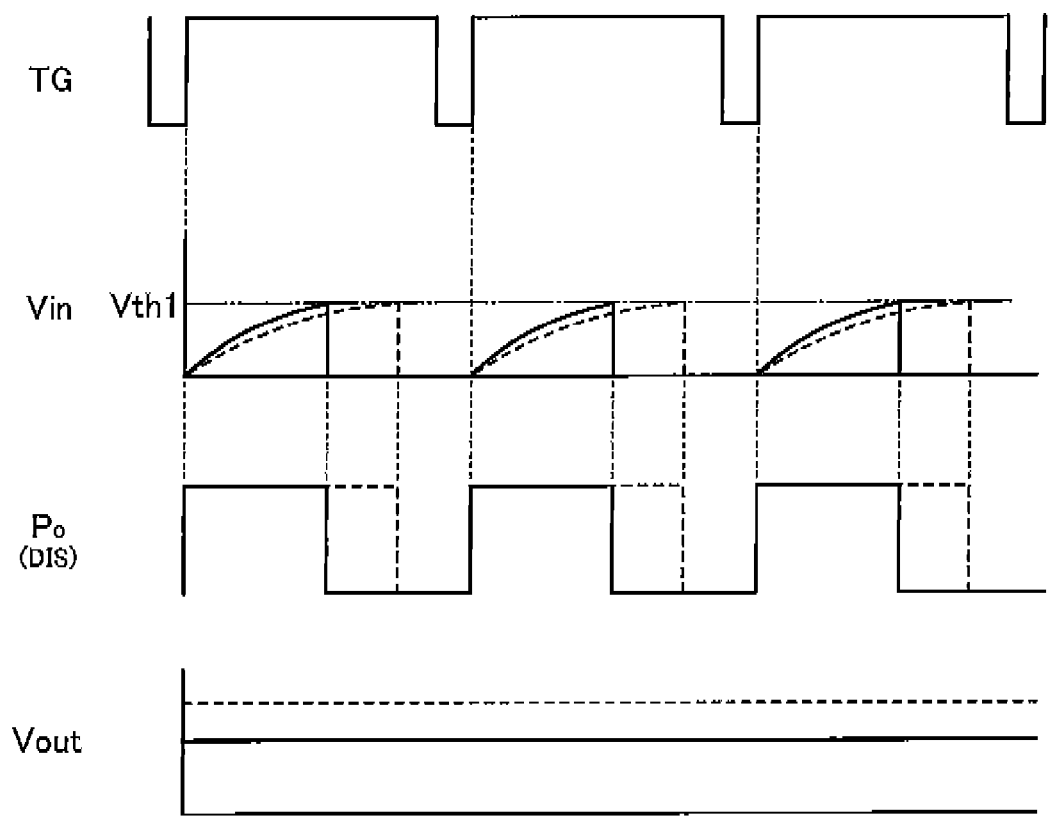
FIG. 5 is an operation waveform chart showing an example of an operation waveform of the detection circuit of the head restraint position adjusting device.
Figure 6:
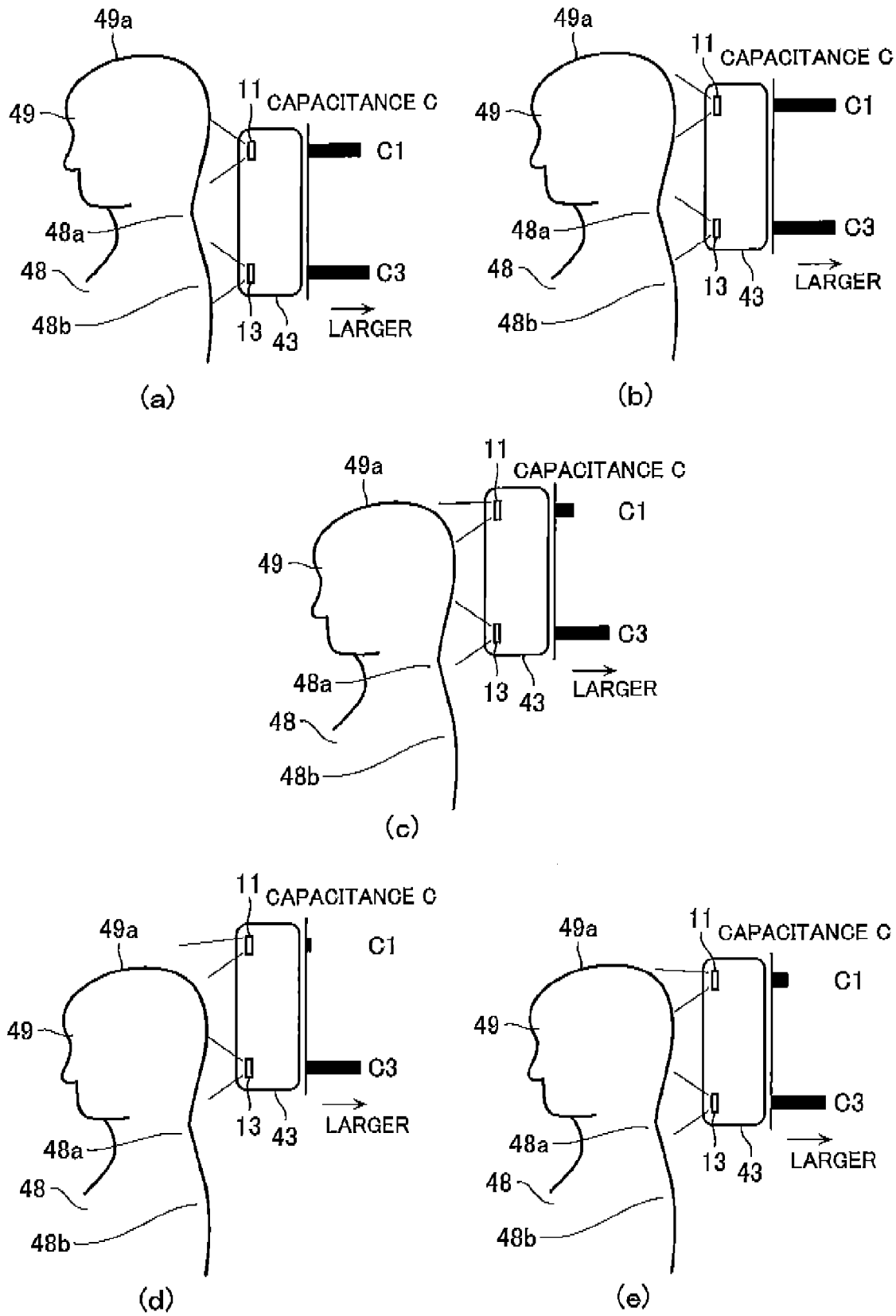
FIG. 6 are operation explanation diagrams for explaining operations of the head restraint position adjusting device.
Figure 7:
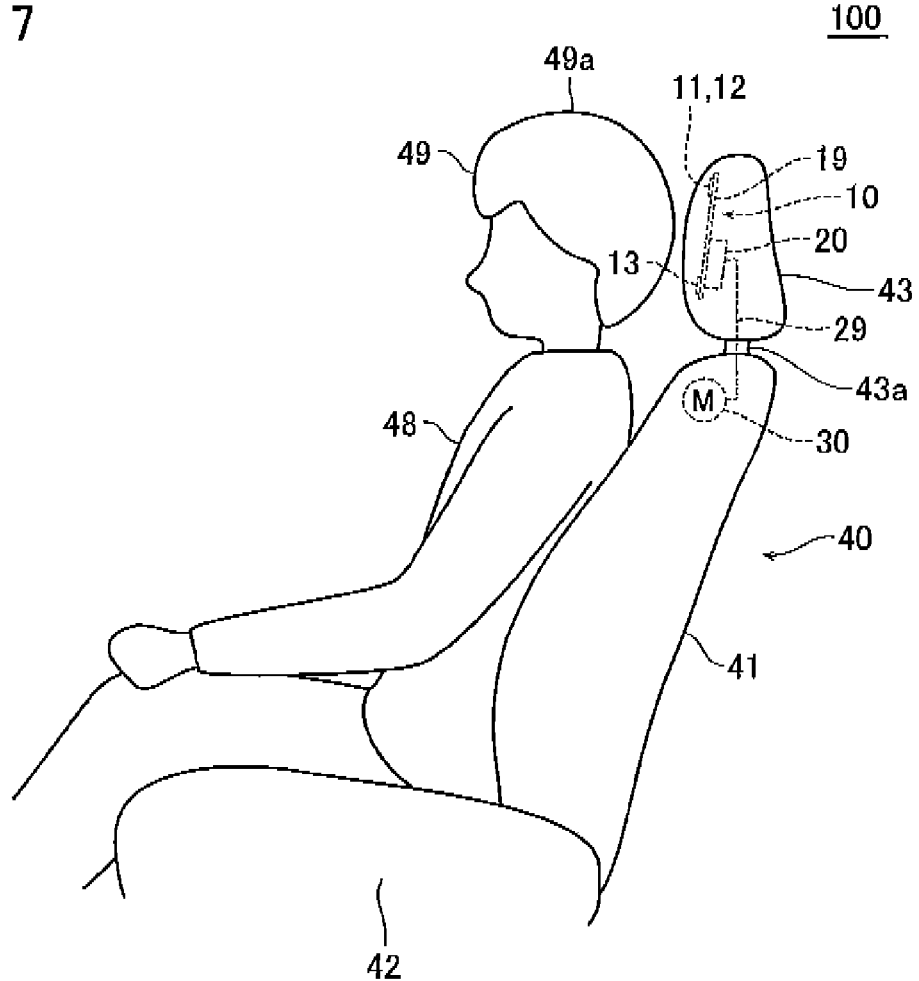
FIG. 7 is a schematic diagram showing an example of a seat in a vehicle provided with a head restraint position adjusting device according to a second embodiment of the present invention.
Figure 8:
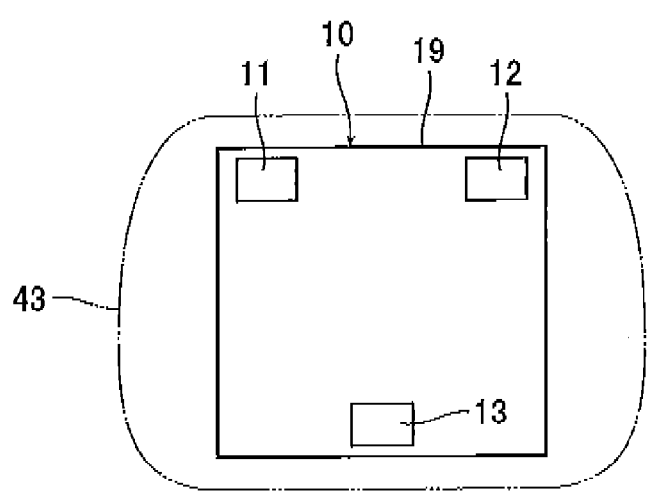
FIG. 8 is an explanatory diagram showing an example arrangement of a part of the head restraint position adjusting device in a head restraint.
Figure 9:
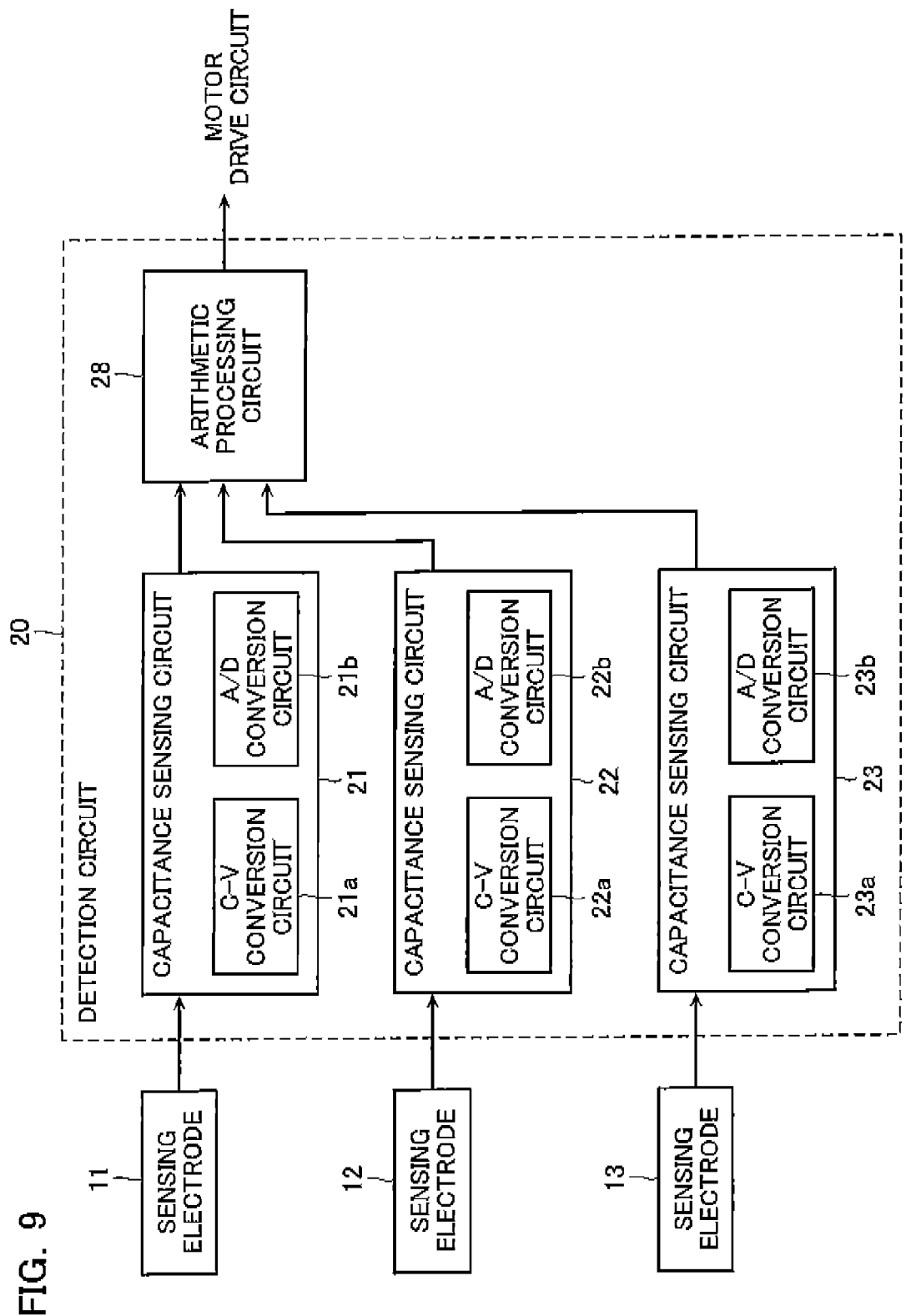
FIG. 9 is a block diagram showing an example of a whole configuration of the head restraint position adjusting device.
Figure 10:
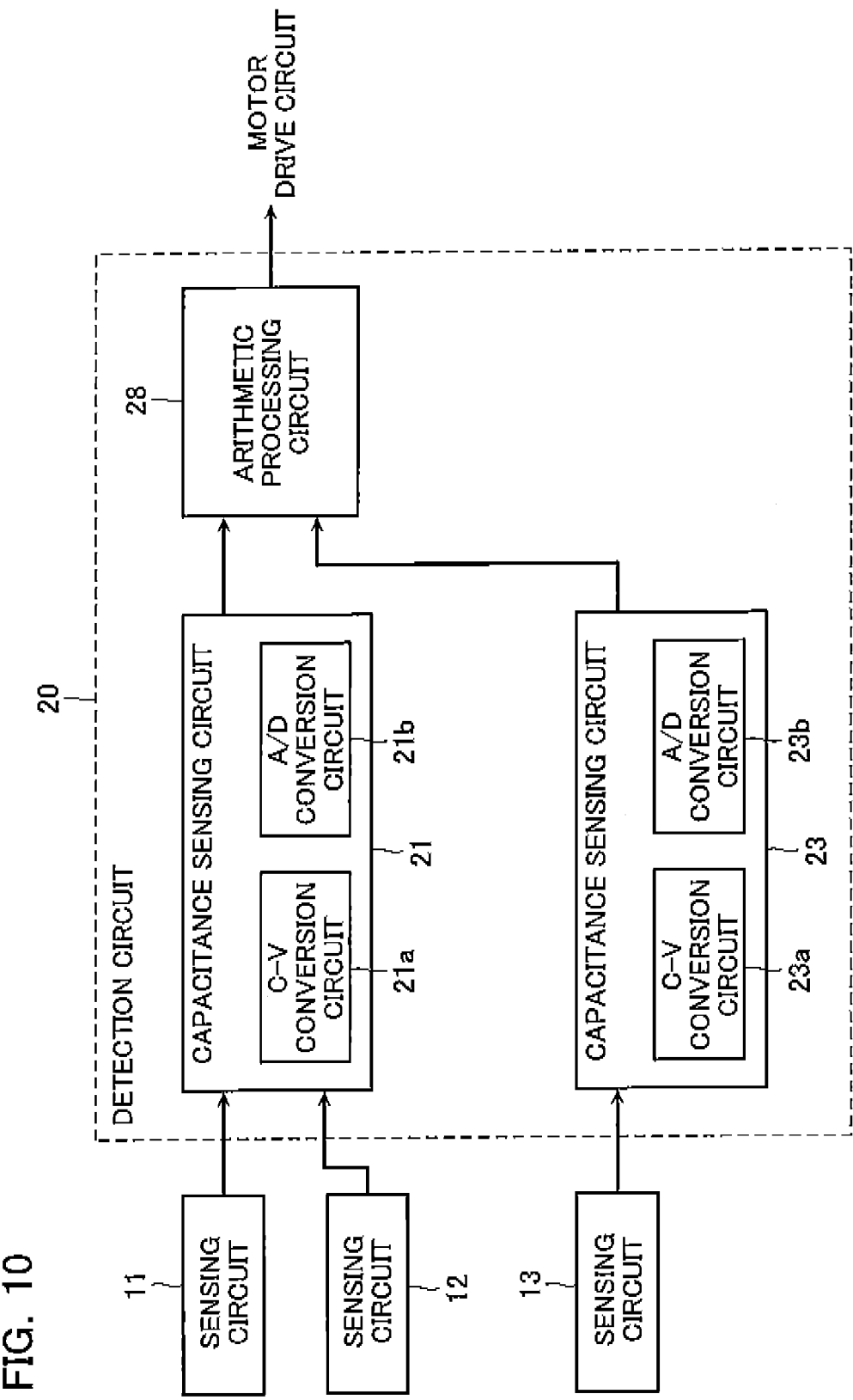
FIG. 10 is a block diagram showing another example of a whole configuration of the head restraint position adjusting device.
Figure 11:
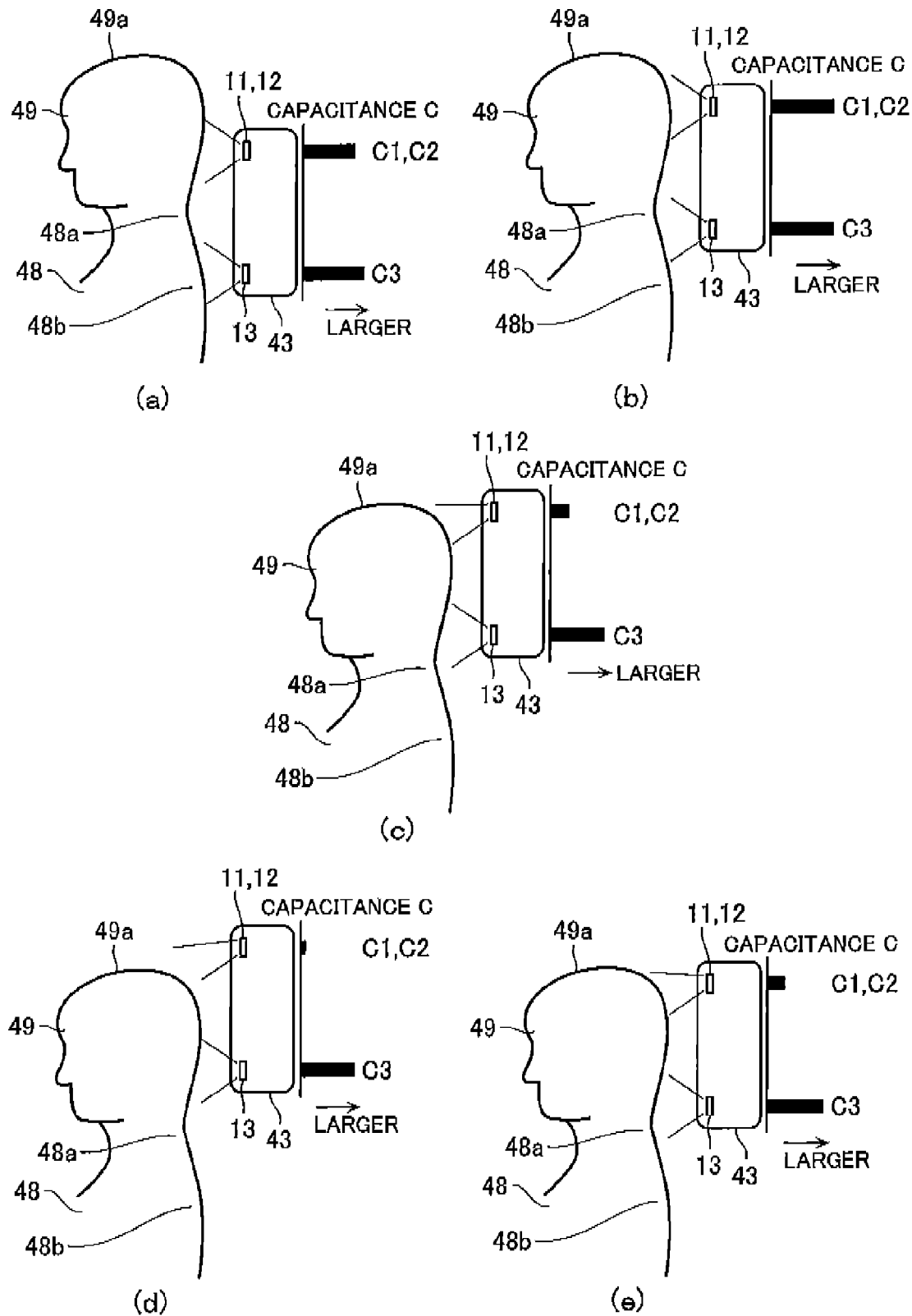
FIG. 11 are operation explanation diagrams for explaining operations of the head restraint position adjusting device.
Figure 12:
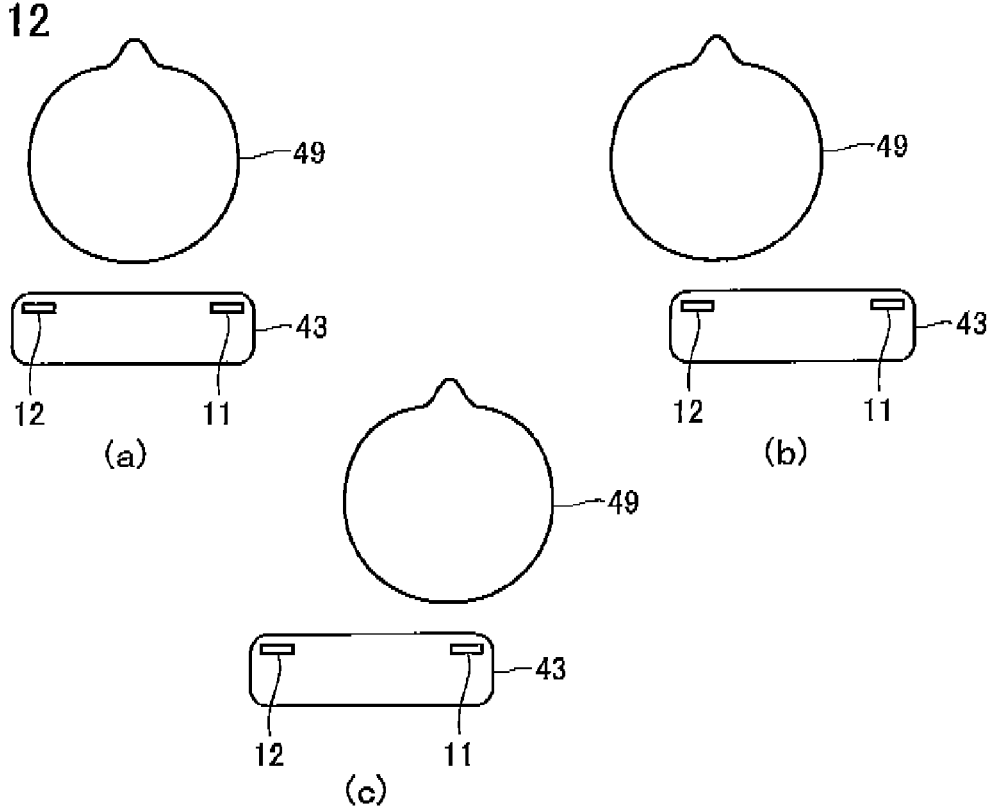
FIG. 12 are operation explanation diagrams for explaining operations of the head restraint position adjusting device.
Figure 13:
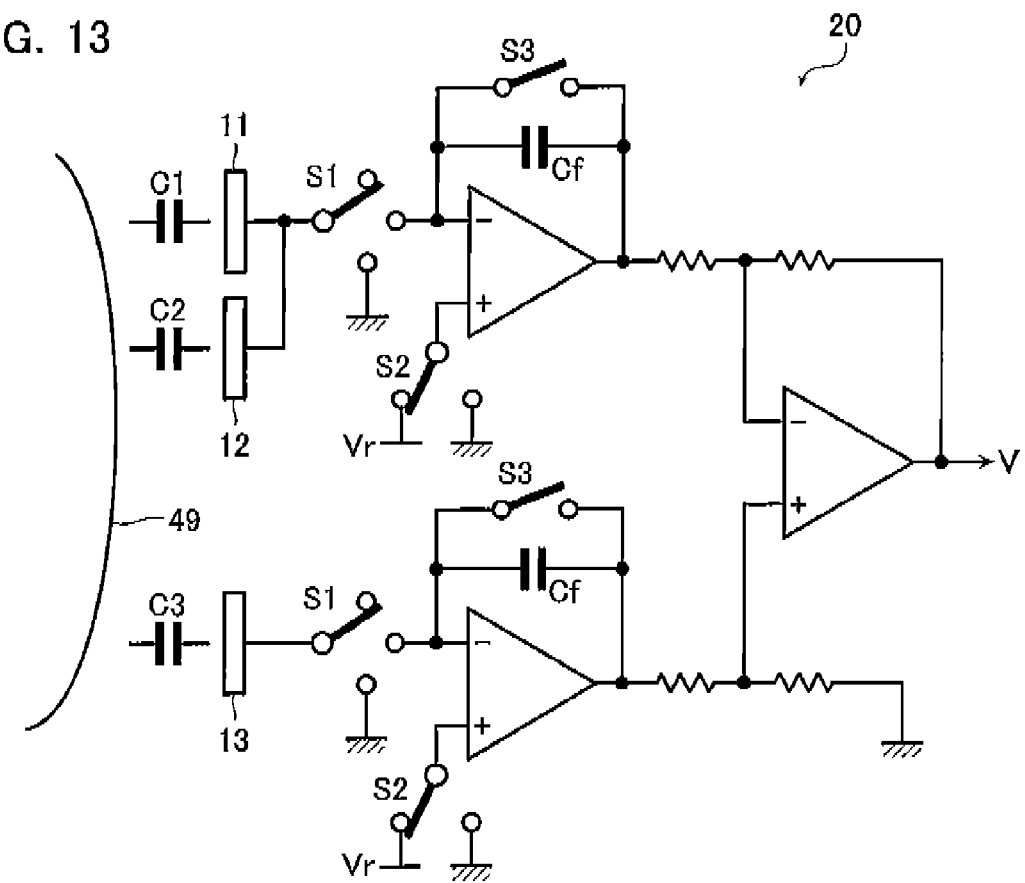
FIG. 13 is an explanatory diagram showing another example of a configuration of a part of the head restraint position adjusting device.
Figure 14:
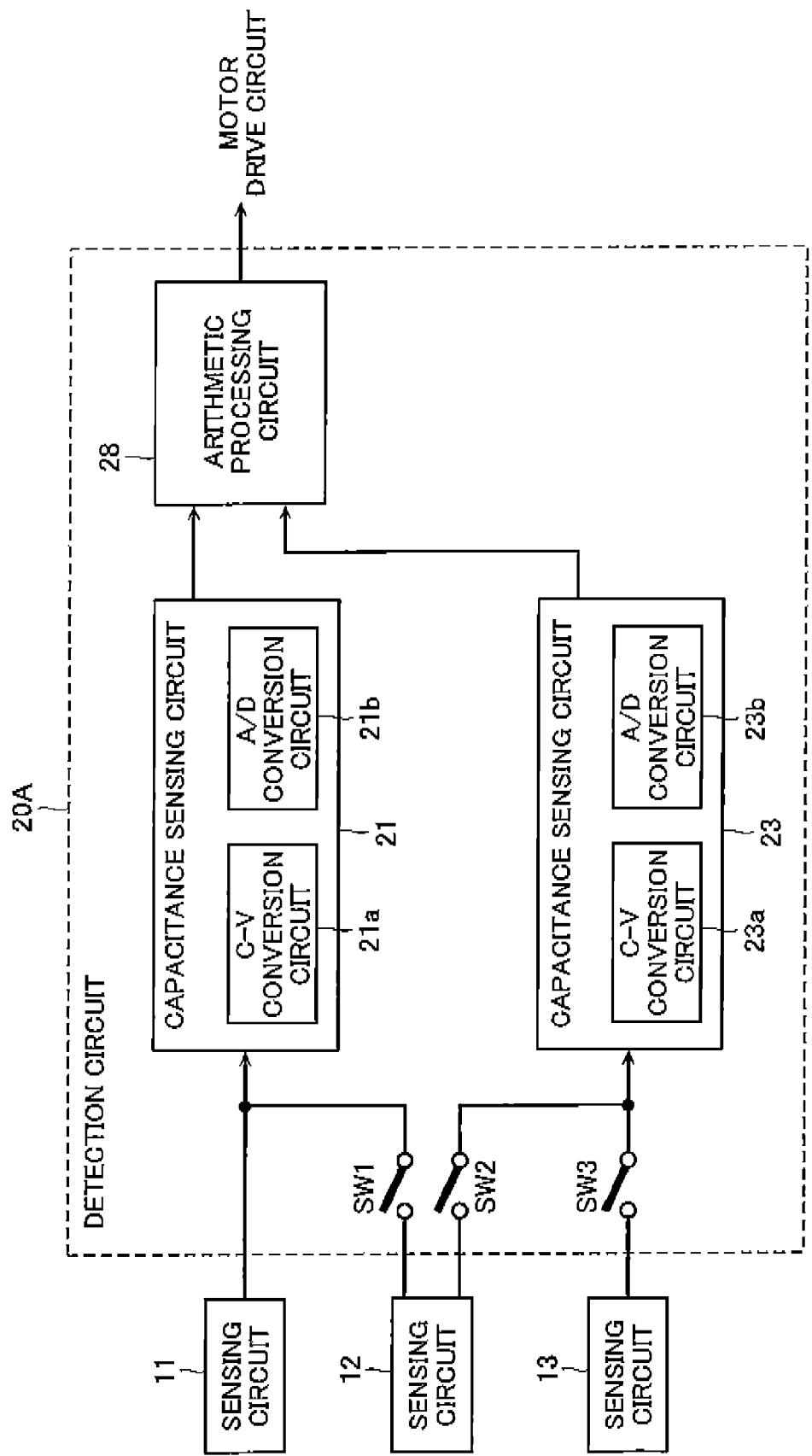
FIG. 14 is a block diagram showing an example of a whole configuration of a head restraint position adjusting device according to a fourth embodiment of the present invention.
Figure 15:
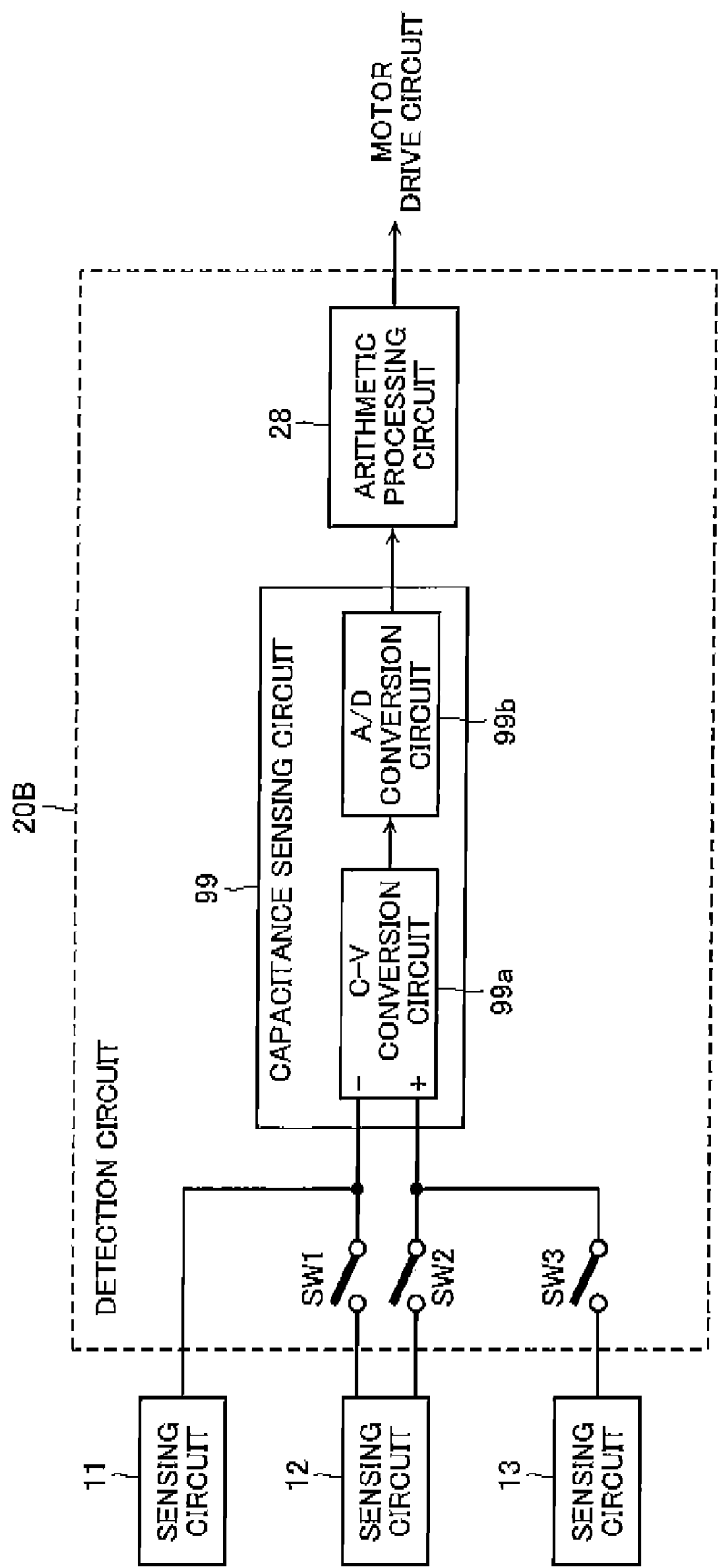
FIG. 15 is a block diagram showing an example of a whole configuration of a head restraint position adjusting device according to a fifth embodiment of the present invention.
Figure 16:
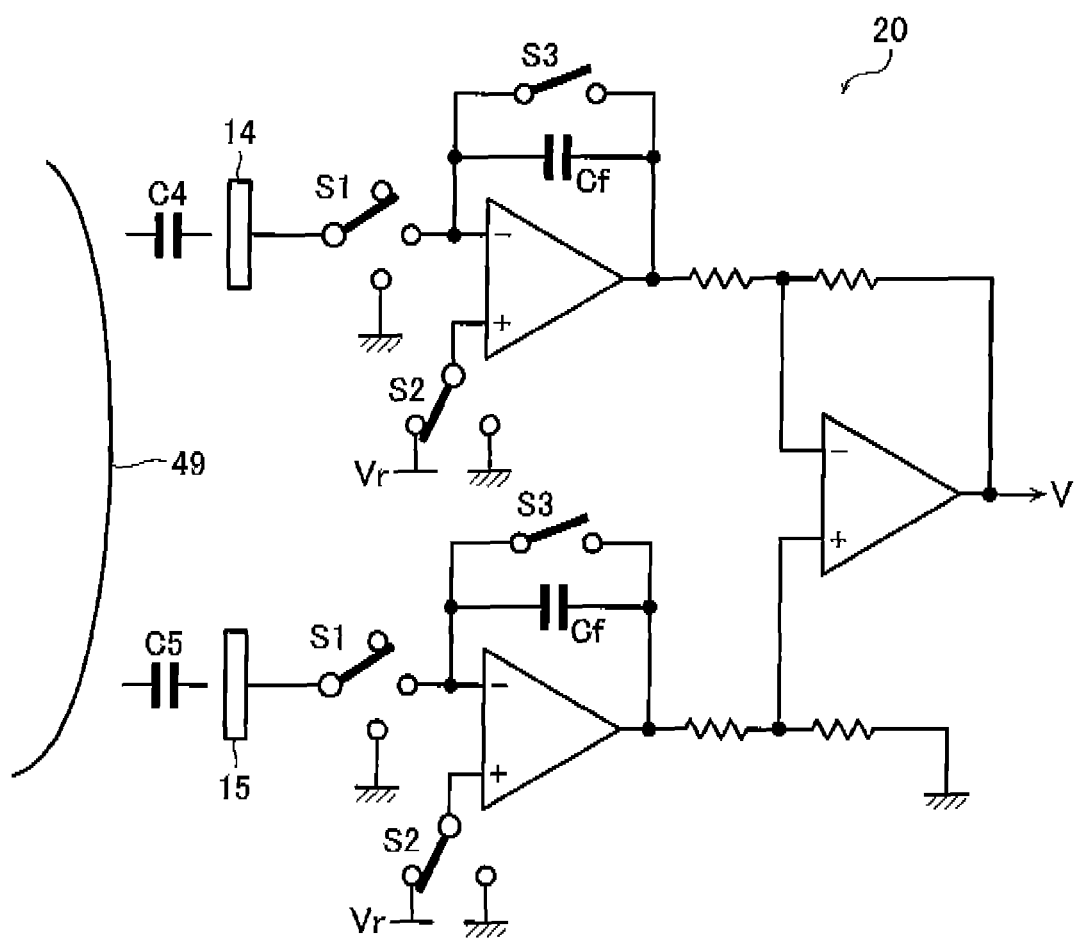
FIG. 16 is an explanatory diagram for explaining an example of a head restraint position adjusting device having another configuration.

EXPLANATION OF REFERENCE NUMERALS 10 capacitance sensor unit
11 first sensing electrode
12 second sensing electrode
13 third sensing electrode
14 fourth sensing electrode
15 fifth sensing electrode
19 board
20 detection circuit
21-23, 99 capacitance sensing circuit
21a-23a, 99a C-V conversion circuit
21b-23b, 99b A/D conversion circuit
28 arithmetic processing circuit
29 harness
30 drive motor unit
40 seat
41 backrest
42 seating portion
43 head restraint
43a support shaft
48 human body
49 head
49a parietal region

The invention claimed is:

1. A head restraint position adjusting device, comprising:
at least one upper sensing electrode provided in an upper portion of a front portion of a head restraint provided on a seat of a vehicle, and configured to sense a capacitance between a human body sitting on the seat and the head restraint;
at least one lower sensing electrode provided in a lower portion of the front portion of the head restraint, and configured to sense a capacitance between the human body and the head restraint;
a detection circuit configured to detect a position of a top of a head of the human body based on sensing signals from the upper sensing electrode and the lower sensing electrode; and
position adjusting means configured to, in accordance with a detection result from the detection circuit, adjust a position of the head restraint relative to the seat to an appropriate position for the head, the appropriate position being based on the position of the top of the head,
the detection circuit being configured to detect the position of the top of the head by comparing a capacitance value indicated by a capacitance, based on the sensing signal from the upper sensing electrode, between a vicinity of the top of the head and the head restraint, with a capacitance value indicated by a capacitance, based on the sensing signal from the lower sensing electrode, between a portion of the human body other than the vicinity of the top of the head and the head restraint.

2. The head restraint position adjusting device according to claim 1, wherein the upper sensing electrode comprises first and second sensing electrodes provided at positions in the upper portion of the front portion of the head restraint, the positions being near both ends of the head restraint in a horizontal direction along a front face of the head restraint, and the lower sensing electrode comprises a third sensing electrode provided at a position in the lower portion of the front portion of the head restraint, the position being near a middle between the both ends of the head restraint in the horizontal direction along the front face.

3. The head restraint position adjusting device according to claim 2, wherein the detection circuit includes: a first capacitance sensing circuit directly connected to either one of the first and second sensing electrodes while being connected to the other of them via a first switch and configured to output information indicating capacitances sensed by these sensing electrodes; a second capacitance sensing circuit connected via a second switch to the sensing electrode connected via the first switch to the first capacitance sensing circuit while being connected to the third sensing electrode via a third switch and configured to output information indicating capacitances sensed by these sensing electrodes; and an arithmetic processing circuit configured to calculate the position of the top of the head and the center position in the horizontal direction by using capacitance values based on the information from the first and second capacitance sensing circuits and output a signal corresponding to calculation result information to the position adjusting means.

4. The head restraint position adjusting device according to claim 1, wherein the position adjusting means moves the head restraint to an uppermost position or a lowermost position relative to the seat, before starting moving the head restraint to the appropriate position.

5. The head restraint position adjusting device according to claim 1, comprising at least two of the upper sensing electrodes, wherein
   the detection circuit detects a center position of the head in a horizontal direction, in addition to the position of the top of the head, based on the sensing signals, and
   in accordance with a detection result from the detection circuit, the position adjusting means adjusts the position of the head restraint relative to the seat to an appropriate position for the head, the appropriate position being based on the position of the top of the head and the center position in the horizontal direction.

6. The head restraint position adjusting device according to claim 5, wherein the upper sensing electrodes are provided at least at positions in the upper portion of the front portion of the head restraint respectively, the positions being near both ends of the head restraint in a horizontal direction along a front face of the head restraint, and the lower sensing electrode is provided at least at a position in the lower portion of the front portion of the head restraint, the position being near a middle between the both ends of the head restraint in the horizontal direction along the front face.

7. The head restraint position adjusting device according to claim 6, wherein the upper sensing electrodes comprises first and second sensing electrodes provided at positions in the upper portion of the front portion of the head restraint respectively, the positions being near the both ends of the head restraint in the horizontal direction, and the lower sensing electrode comprises a third sensing electrode provided at a position in the lower portion of the front portion of the head restraint, the position being near the middle between the both ends in the horizontal direction.

8. The head restraint position adjusting device according to claim 5, wherein the detection circuit detects the position of the top of the head by comparing capacitance values indicated by capacitances, based on sensing signals from the upper sensing electrodes, between vicinities of the top of the head and the head restraint, with a capacitance value indicated by a capacitance, based on a sensing signal from the lower sensing electrode, between a portion of the human body other than the vicinities of the top of the head and the head restraint, and detects the center position in the horizontal direction by comparing the capacitance values from the upper sensing electrodes respectively with each other.

9. The head restraint position adjusting device according to claim 5, wherein when a comparison value based on capacitance values from the upper sensing electrodes and a capacitance value from the lower sensing electrode is not included in a preset threshold range, the position adjusting means moves the head restraint in an upward direction or a downward direction until the comparison value comes within the threshold range, and after the detection circuit determines the position of the top of the head when the comparison value is included in the threshold range, the position adjusting means moves the head restraint in a leftward direction or a rightward direction until the capacitance values from the upper sensing electrodes become equal detected values, and the detection circuit determines the center position in the horizontal direction when the detected values become equal.

10. The head restraint position adjusting device according to claim 5, wherein the position adjusting means moves the head restraint to a center position of the seat at an uppermost position or a lowermost position relative to the seat, before starting moving the head restraint to the appropriate position.

11. The head restraint position adjusting device according to claim 5, wherein the detection circuit detects the position of the top of the head by comparing capacitance values indicated by capacitances, based on sensing signals from the upper sensing electrodes, between vicinities of the top of the head and the head restraint, with a capacitance value indicated by a capacitance, based on a sensing signal from the lower sensing electrode, between a portion of the human body other than the vicinities of the the top of the head and the head restraint.

12. The head restraint position according to claim 5, wherein the detection circuit includes: a first capacitance sensing circuit directly connected to either one of the first and second sensing electrodes while being connected to the other of them via a first switch and configured to output information indicating capacitances sensed by these sensing electrodes; a second capacitance sensing circuit connected via a second switch to the sensing electrode connected via the first switch to the first capacitance sensing circuit while being connected to the third sensing electrode via a third switch and configured to output information indicating capacitances sensed by these sensing electrodes; and an arithmetic processing circuit configured to calculate the position of the top of the head and the center position in the horizontal direction by using capacitance values based on the information from the first and second capacitance sensing circuits and output a signal corresponding to calculation result information to the position adjusting means.

13. The head restraint position adjusting device according to claim 1, further comprising a plurality of auxiliary electrodes provided in an internal side of the head restraint opposite to the front portion where the upper sensing electrode and the lower sensing electrode are provided, and configured to suppress change of capacitances of the sensing electrodes due to an external condition change,
   wherein the plurality of auxiliary electrodes are given a potential equal to that of the sensing electrodes.

14. The head restraint position adjusting device according to claim 13, wherein the auxiliary electrode is further provided at least at a position of the head restraint, the position being near the seat and near the lower sensing electrode.

15. The head restraint position adjusting device according to claim 1, wherein the detection circuit detects the position of the top of the head by comparing capacitance values indicated by capacitances, based on sensing signals from the upper sensing electrodes, between vicinities of the top of the head and the head restraint, with a capacitance value indicated by a capacitance, based on a sensing signal from the lower sensing electrode, between a portion of the human body other than the vicinities of the top of the head and the head restraint.

16. The head restraint position adjusting device according to claim 1, wherein the position adjusting means being configured to, when a comparison value based on the capacitance value from the upper sensing electrode and the capacitance value from the lower sensing electrode is not included in a preset threshold range, move the head restraint in an upward direction or a downward direction until the comparison value comes within the threshold range, and the detection circuit being configured to determine the position of the top of the head when the comparison value is within the threshold range.

* * * * *